(12) United States Patent
Smith et al.

(10) Patent No.: US 12,503,784 B2
(45) Date of Patent: Dec. 23, 2025

(54) METHODS AND APPARATUS FOR EXTRACTING METALS FROM MATERIALS

(71) Applicant: SiTration, Inc., Cambridge, MA (US)

(72) Inventors: Brendan D. Smith, Cambridge, MA (US); Daniel Bregante, Cambridge, MA (US); Ahmed Helal, Cambridge, MA (US); Morgan Baima, Cambridge, MA (US); Jatin Patil, Cambridge, MA (US)

(73) Assignee: SiTration, Inc., Cambridge, MA (US)

( * ) Notice: Subject to any disclaimer, the term of this patent is extended or adjusted under 35 U.S.C. 154(b) by 0 days.

(21) Appl. No.: 18/750,807

(22) Filed: Jun. 21, 2024

(65) Prior Publication Data

US 2024/0426015 A1    Dec. 26, 2024

Related U.S. Application Data

(60) Provisional application No. 63/522,346, filed on Jun. 21, 2023.

(51) Int. Cl.
*C25C 7/02*    (2006.01)
*C25C 1/12*    (2006.01)

(52) U.S. Cl.
CPC . *C25C 7/02* (2013.01); *C25C 1/12* (2013.01)

(58) Field of Classification Search
CPC .................................. C25C 1/12; C25C 7/02
See application file for complete search history.

(56) References Cited

U.S. PATENT DOCUMENTS

| | | | |
|---|---|---|---|
| 2,119,936 A | | 6/1938 | White |
| 3,692,647 A | * | 9/1972 | Chambers et al. ........ C25C 5/02 204/295 |
| 3,799,850 A | | 3/1974 | Entshev et al. |
| 3,852,175 A | * | 12/1974 | Hoekje ................. C25B 11/069 205/532 |
| 4,040,914 A | * | 8/1977 | Nidola ..................... C25C 1/08 204/290.13 |
| 4,134,806 A | * | 1/1979 | De Nora ................... C25C 7/02 205/610 |
| 4,153,521 A | | 5/1979 | Litvak et al. |
| 4,525,417 A | | 6/1985 | Dimigen et al. |
| 5,091,447 A | | 2/1992 | Lomasney |
| 5,194,125 A | | 3/1993 | Cachet et al. |
| 5,405,509 A | | 4/1995 | Lomasney et al. |
| 5,489,370 A | | 2/1996 | Lomasney et al. |
| 6,793,793 B2 | | 9/2004 | Yoshida et al. |

(Continued)

FOREIGN PATENT DOCUMENTS

| CN | 102208628 A | 10/2011 |
|---|---|---|
| CN | 213304173 A | 5/2021 |

(Continued)

OTHER PUBLICATIONS

International Search Report and Written Opinion for PCT Application No. PCT/US2024/035074, dated Nov. 5, 2024, 23 pages.

(Continued)

*Primary Examiner* — Ciel P Contreras
(74) *Attorney, Agent, or Firm* — Polsinelli PC

(57) ABSTRACT

The present disclosure relates to an apparatus and method for selectively recovering target metals or minerals from a metal or mineral containing mixture/solution.

31 Claims, 8 Drawing Sheets

(56) References Cited

U.S. PATENT DOCUMENTS

| | | | |
|---|---|---|---|
| 7,870,886 B1 | 1/2011 | Bourque | |
| 8,298,827 B2 | 10/2012 | Ishida et al. | |
| 8,316,917 B2 | 11/2012 | Bourque | |
| 9,827,517 B2 | 11/2017 | Vecitis et al. | |
| 9,844,756 B2 | 12/2017 | Vecitis et al. | |
| 10,128,341 B2 | 11/2018 | Grossman et al. | |
| 10,160,669 B2 | 12/2018 | Musson | |
| 10,190,030 B2 | 1/2019 | Harrison et al. | |
| 10,683,563 B2 | 6/2020 | Harrison et al. | |
| 10,829,676 B2 | 11/2020 | Harrison et al. | |
| 10,935,006 B2 | 3/2021 | Harrison et al. | |
| 10,943,982 B2 | 3/2021 | Grossman et al. | |
| 11,004,943 B2 | 5/2021 | Smith et al. | |
| 11,504,645 B2 | 11/2022 | Schoonen et al. | |
| 11,509,000 B2 | 11/2022 | Alemrajabi et al. | |
| 11,566,304 B2 | 1/2023 | Wyrsta | |
| 12,208,399 B2 | 1/2025 | O'Connor et al. | |
| 12,252,409 B2 | 3/2025 | Harrison | |
| 2006/0124452 A1 | 6/2006 | Robinson et al. | |
| 2009/0120801 A1 | 5/2009 | Zhou | |
| 2010/0089763 A1 | 4/2010 | Darron et al. | |
| 2010/0224497 A1 | 9/2010 | Livshits et al. | |
| 2010/0224506 A1 | 9/2010 | Livshits et al. | |
| 2010/0252441 A1* | 10/2010 | Chidsey | C25B 1/26 205/556 |
| 2011/0024072 A1 | 2/2011 | Bourque | |
| 2011/0107905 A1 | 5/2011 | Bourque | |
| 2012/0024719 A1 | 2/2012 | Botte | |
| 2012/0211367 A1 | 8/2012 | Vecitis | |
| 2012/0312700 A1* | 12/2012 | Bard | C25B 11/00 205/794.5 |
| 2013/0134053 A1 | 5/2013 | Musson | |
| 2013/0153437 A1 | 6/2013 | Sandoval et al. | |
| 2013/0209336 A1 | 8/2013 | Harrison et al. | |
| 2013/0327650 A1 | 12/2013 | Mayer et al. | |
| 2014/0054180 A1 | 2/2014 | Morimitsu | |
| 2014/0116506 A1 | 5/2014 | Cheong et al. | |
| 2014/0131221 A1 | 5/2014 | Lindgren et al. | |
| 2015/0129427 A1 | 5/2015 | Raterink et al. | |
| 2016/0024670 A1* | 1/2016 | Fiorucci | C25C 7/06 204/267 |
| 2016/0047054 A1 | 2/2016 | Wang et al. | |
| 2018/0265996 A1* | 9/2018 | Rosvall | C25B 11/093 |
| 2019/0226051 A1 | 7/2019 | Pierpoint et al. | |
| 2021/0249678 A1 | 8/2021 | Chiang et al. | |
| 2022/0062837 A1 | 3/2022 | Angammana et al. | |
| 2022/0307148 A1 | 9/2022 | Fatur et al. | |
| 2022/0389601 A1 | 12/2022 | Vecitis et al. | |
| 2022/0401882 A1 | 12/2022 | Smith et al. | |
| 2023/0031927 A1* | 2/2023 | Boehme | B01D 61/428 |
| 2023/0042034 A1 | 2/2023 | Alemrajabi et al. | |
| 2024/0318277 A1 | 9/2024 | Dunlevy et al. | |

FOREIGN PATENT DOCUMENTS

| | | | |
|---|---|---|---|
| GB | 2317921 A | | 4/1998 |
| WO | 2002057517 A1 | | 7/2002 |

OTHER PUBLICATIONS

Lee, et al., "A Layered hollow sphere architecture of iridium-decorated carbon electrode for oxygen evolution catalysis," Carbon, Catalyst, vol. 115, Dec. 21, 2016, pp. 50-58.

Oksanen, Mika, "Annealing Study of Bismuth Thin Films," University of Jyvaskyla, Nanoscience Center, Department of Physiscs, Nanophysics, Jun. 23, 2010, 44 pages.

Yan, et al., "In-situ synthesis of self-coated bismuth-carbon composite electrode for chloride-storage in capacitive deionization," Journal of Environmental Chemical Engineering, vol. 10, issue 6, Dec. 2022, 4 pages.

Zhang, et al., A comprehensive review on controlling surface composition of Pt-based bimetallic electrocatalyst, 2018, pp. 1-31. [retrieved on Aug. 16, 2024] Retrieved from the internet <URL:https://www.sciencedirect.com/science/article/abs/pii/S1572665721009851>.

* cited by examiner

METHODS AND APPARATUS FOR EXTRACTING METALS FROM MATERIALS

TECHNICAL FIELD

This invention relates generally to the field of extracting metals from industrial streams in the fields of mining, metals refining, waste treatment and valorization, and critical materials recycling, and more specifically to an apparatus and method for recovering metals and minerals from materials.

BACKGROUND

Metal and mineral containing streams is generated from various sources including batteries, mining processes, and recycling and refining operations.

The global mining, refining, and recycling industries are under increasing pressure to shrink their environmental footprint. These industries rely on concentrating equipment to create a concentrate comprising a substrate or complex mixture of metals and other materials for shipment to a smelter. In mining, this process can leave significant amounts of finely ground minerals and/or toxic chemicals in tailings left on the mine site that can leach out into the environment. The tailings are often environmental hazards and costly for mining companies or governments to maintain and/or remediate. In refining and recycling, large volumes of input chemicals and large amounts of energy are consumed to recover comparatively small amounts of high value critical materials.

Copper, silver, and gold are generally extracted from sulphide ores and are characterized by their unique physico-chemical characteristics and are essential commodities for industrial applications outside of their monetary or decorative value. All three metals are also excellent conductors of electricity. Copper is the third most common metal in use, trailing only iron and aluminum. Copper sulphides, in naturally occurring mineral deposits, are normally found in association with sulphides of iron, nickel, lead, zinc and molybdenum and often contain traces of silver and gold. Chalcopyrite is one of the most common ores from which copper is extracted. Copper has wide-ranging applications in, for example, electrical wires, roofing and plumbing and industrial machinery.

The conventional extractive metallurgical processes for extracting copper generally involve pyrometallurgical methods for recovering copper values from copper sulphides. Known recovery processes mostly involve grinding the ore, froth flotation (which selectively separates minerals from gangue by taking advantage of differences in hydrophobicity) to obtain an ore concentrate, and roasting and reduction with carbon or electrowinning. However, such treatment often entails expensive mining and beneficiation process steps to concentrate the sulphides. In addition, the production of copper employing the known technology from sulphidic copper ores produces large amounts of sulfur dioxide, carbon dioxide and cadmium vapor. Smelter slag and other residues of the process also contain significant amounts of heavy metals.

Moving to batteries, as battery technology has become an integral part of today's society, the need for recycling of batteries, battery components, and critical battery materials is rapidly increasing. Of particular importance, are lithium (Li), cobalt (Co), manganese (Mn), and nickel (Ni). Current methods typically include grinding the important battery components (e.g., the anode and the cathode) down into a "black mass", leaching the black mass by exposing it to strong acids (e.g., $H_2SO_4$ and HCl), adding neutralizing agents (e.g., sodium compounds, such as sodium carbonate and sodium hydroxide), and precipitating out the valuable materials. Solvent extraction and thermal crystallization are also common process stages to enable further separation and purification of critical materials.

Although these methods are useful, they are suboptimal with respect to capital cost, operating cost, and environmental impact. Additionally, using chemical precipitation techniques ends up invariably contaminating the black mass such that extraction of lithium becomes difficult due to residual sodium and other chemicals. Thus, there is a need in the field of hydrometallurgical battery recycling to create a new and useful system and method for low-cost and environmentally sustainable critical materials extraction that minimizes chemical precipitation, thermal crystallization, and solvent exchange.

SUMMARY

An aspect of the present disclosure is an apparatus for extracting target metals or minerals from a metal or mineral containing mixture/solution. The apparatus is an electrochemical reactor.

In one aspect, the electrochemical reactor includes a flow cell with a plurality of electrodes. The electrodes include one or more anodes and one or more cathodes. In certain aspects, each electrode includes a non-porous or porous electrode material having a roughened surface and a voltage source configured to apply a voltage between the one or more anodes and the one or more cathodes. In some aspects, the one or more cathodes and anodes form an array of alternating anodes and cathodes. In other aspects, the flow cell is configured to receive a metal containing solution. In another aspect, the flow cell is a closed loop or partially closed loop configuration. The metal containing solution may be from a lithium-ion battery recycling stream, a mining production stream (including but not limited to heap leachate or pregnant leach solution), a waste stream, a refining stream, or a mining-affected water source.

In some aspects, the target metals or minerals may include but are not limited to lithium, manganese, cobalt, nickel, aluminum, iron, copper, lead, zinc, silver, cadmium, precious metals (e.g., gold, silver), platinum group metals (e.g., platinum, palladium, rhodium, ruthenium, osmium, iridium, rhenium), rare earth elements (e.g., lanthanum, cerium, praseodymium, neodymium, promethium, samarium, europium, gadolinium, terbium, dysprosium, holmium, erbium, thulium, ytterbium, lutetium, scandium, and yttrium), mercury, thallium, selenium, bismuth, lead, uranium, polonium, oxides or hydroxides thereof, or combinations thereof.

In some aspects, the electrode material includes silicon, carbon, stainless-steel, ferro-alloys, lead-alloys, or combinations thereof. In other aspects, at least one of the electrodes is a silicon electrode. In certain aspects, the recovered metal is stripped periodically from the silicon electrode and the silicon electrode is reusable.

In some aspects of the present disclosure, the electrodes are in series or parallel flow configurations.

In some aspects of the present disclosure, the distance between the electrodes ranges from about 1 mm to about 100 cm.

In other aspects of the present disclosure, the electrode thickness ranges from about 200 µm to about 1 cm.

Another aspect of the present disclosure includes a method for extracting metals from a metal containing mixture/solution. The method includes providing an electrochemical reactor; feeding a metal containing solution into the electrochemical reactor causing the metal containing solution to flow across or through the plurality of electrodes; applying a voltage between the plurality of electrodes; transferring metal from the metal containing solution to the plurality of electrodes by electrowinning; selectively depositing the corresponding metal or the corresponding metal oxide or hydroxide on the electrodes; and recovering the corresponding metal or the corresponding metal containing species by mechanical separation, chemical separation, electrochemical separation, or a combination thereof, either in situ within the chemical reactor or by removing the electrodes from the reactor.

In some aspects, the electrochemical reactor includes a flow cell with a plurality of electrodes. The electrodes include one or more anodes and one or more cathodes. Each electrode may be a porous or non-porous electrode material having a roughened surface.

In certain aspects, the voltage applied ranges from about 0 V to about 20 V.

In certain aspects, the pH of the metal containing solution is from about −1 to less than 10.

In other aspects, the method further comprises maintaining the temperature of the flow cell from about 0° C. to about 120° C.

In certain aspects, the method further comprises applying a current density ranging from about 0 to about 2 A cm$^{-2}$ between the electrodes.

In certain aspects, the mechanical separation includes air or water jet, sonication, or mechanical shear.

In certain aspects, the chemical separation includes acidic dissolution of recovered metal.

In some aspects, the target metal or mineral recovered by electrochemical refining by pairing the silicon electrode coated with the recovered material in an electrochemical reactor with a counter-electrode composed of the same material as the recovered material. In other aspects, the counter-electrode for recovery may not include the same material as the recovered target material but may still selectively recover the target material by electrochemical refining.

DETAILED DESCRIPTION

Figure 1:
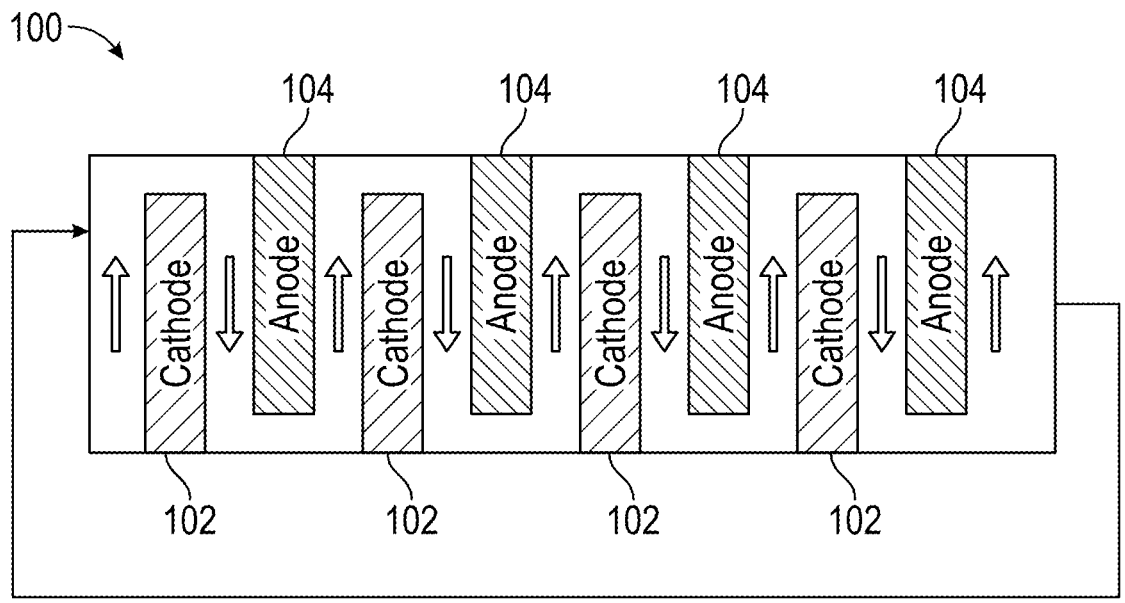
FIG. 1 is a top view schematic of one example of an electrochemical reactor for extracting metals from a metal or mineral containing mixture/solution.

The following description of the embodiments of the invention is not intended to limit the invention to these embodiments but rather to enable a person skilled in the art to make and use this invention.

Overview

An apparatus and method for extracting metals from materials includes an electrochemical flow cell reactor. The material may be a primary mining stream such as heap leachate or pregnant leach solution, waste material, or material to be refined. The material may be a mixture comprising a solvent, a solution, a slurry, a suspension, or any other mixture containing a target material (e.g., target metal or target mineral). A metal and mineral-containing solution can originate from battery recycling, mining, refining, or any other process generating metal and/or mineral materials. The metals and minerals include but are not limited to lithium, manganese, cobalt, nickel, copper, lead, zinc, silver, cadmium, precious metals (e.g., gold, silver), platinum group metals (e.g., platinum, palladium, rhodium, ruthenium, osmium, iridium, rhenium), rare earth elements (e.g., lanthanum, cerium, praseodymium, neodymium, promethium, samarium, europium, gadolinium, terbium, dysprosium, holmium, erbium, thulium, ytterbium, lutetium, scandium, and yttrium), mercury, thallium, selenium, bismuth, lead, uranium, polonium, ions thereof, or mixtures thereof.

Disclosed herein is an electrochemical flow cell reactor with an array of reusable anode and cathode electrodes for critical metal and mineral extraction. In some examples, the flow cell reactor may utilize reusable silicon electrodes for either the cathode, anode, or both to electrodeposit target metals or metal oxides or hydroxides out of acidic solutions (e.g., battery recycling leachate, primary mining heap leachate, refining streams, or mining water). The acidic solution flows through an array of alternating anode and cathode electrodes set up in a parallel or series flow configuration (see FIGS. 1 and 2) and may be cycled through in a closed loop configuration or a partially closed loop configuration. Although it is a benefit that the electrochemical flow cell reactor disclosed herein can work with acidic solutions (e.g., pH<7.0), and even highly acidic solutions (e.g., pH<2.0), it is also contemplated that the reactor will compatible with basic solutions (e.g. pH>7.0). In a partially closed loop configuration, the process flow may loop a number of times, and then flow downstream to another stage after the looping is complete. A voltage/current may be applied between the cathodes and the anodes to selectively electrowin specific target metals or minerals out of solution. Selectivity may be based on the electrochemical potential of reduction for target materials. In a broader process several extraction stages may need to be combined to first remove contaminants that extract at lower voltages. To arrive at the ideal voltage for extraction of a particular target material, feedback loops may be used to adjust the voltage based on sensor data in real time.

After electrodeposition, the electrodes may be removed from the flow cell and the target metal may be recovered via mechanical separation (e.g., sonication, mechanical shear, water jet, air jet), chemical separation (e.g., acidic dissolution of recovered metal) or electrochemical separation (e.g., applied voltage/current, electrorefining). This target material recovery may also occur in situ within the electrochemical reactor.

In some variations, the electrodes may be interdigitated anodes and cathodes that can be easily disassembled and reassembled for quick recovery of the plated materials. In various examples, the target materials plated include but are not limited to lithium, manganese, cobalt, nickel, copper, lead, zinc, silver, cadmium, precious metals (e.g., gold, silver), platinum group metals (e.g., platinum, palladium, rhodium, ruthenium, osmium, iridium, rhenium), rare earth elements (e.g., lanthanum, cerium, praseodymium, neodymium, promethium, samarium, europium, gadolinium, terbium, dysprosium, holmium, erbium, thulium, ytterbium, lutetium, scandium, and yttrium), mercury, thallium, selenium, bismuth, lead, uranium, polonium, oxides or hydroxides thereof, or combinations thereof.

The apparatus and method may be particularly applicable for target material extraction from a battery leachate solution (e.g., as applied to battery recycling). That is, the system and method may be applicable for extraction of typical battery compounds (e.g., lithium carbonate, lithium hydroxide, cobalt sulfate, nickel sulfate, manganese oxide) from a battery or battery leachate solution (e.g., black mass leachate). In some examples, major black mass components may include but are not limited to Al, Co, Cu, Fe, Li, Ni, Ag, Zn, Mn, graphite, F, P, and ions thereof.

The apparatus and method may be particularly applicable for target material extraction from heap leachate or pregnant leach solution in primary mining production of metals including but not limited to copper, cobalt, nickel, gold, platinum, and palladium.

The apparatus and method may be particularly applicable for target material extraction from metals refining or recycling streams, specifically refining or recycling of precious metals or platinum group metals.

The apparatus and method disclosed herein provide benefits over presently used electrodes or extraction methods. For example, at least one of the anode/cathode may be silicon and can be reused after recovery of target materials/metals, silicon electrodes may allow for improved critical materials extraction versus common electrode materials such as carbon, titanium, platinum, and stainless-steel with respect to durability, cost, efficiency, and performance, and interdigitated connected electrodes may allow for quick assembly/disassembly for recovery of electroplated metal/metal oxide. In some examples, silicon is more durable than common electrode materials such that use of silicon as both the anode and cathode allows for use in highly acidic solutions such as concentrated sulfuric, nitric, and hydrochloric acid, and even more challenging mixtures like aqua regia (nitric+hydrochloric acid). Because the targets can be electro-extracted directly from acidic streams when using silicon electrodes, there is no need for use of neutralizing chemicals in the electro-extraction process. In addition, the acid can be recycled. Electro-extracting at low pH (e.g., pH<2.0) also provides some unique performance advantages, like enabling the separation of Co and Ni with high selectivity (e.g., Co is extracted and Ni remains behind), which doesn't happen at higher pH (they almost always come out together).

In some aspects, silicon anode/cathode may be coated or functionalized with one or more coating materials that serve to enhance the durability, efficiency, and performance of the electrodes. In an example, coating a silicon anode acts to lower the anode voltage, thereby increasing extraction efficiency. Coating also increases the long-term chemical and electrochemical stability of the electrode. The coating materials may include, but are not limited to Ti, Ni, Co, Cu, Ag, Pt, Pd, Au, Ir, Hf, Pb, Sb, Ca, Ru, Rh, or combinations thereof. The coating materials may be present as metals or compounds such as oxides or silicides thereof. The coating may be composed of a combination of two or more coating materials. The thickness of the coatings can range from about 1 nm to about 500 nm.

The coating materials may be deposited by physical vapor deposition (e.g., magnetron sputtering, electron beam evaporation, thermal evaporation, pulsed laser deposition), electroplating, ion implantation, thermal spray deposition, or chemical vapor deposition. The coating may then be further refined by thermal annealing. In some examples, prior to deposition, the surface of the electrode may be prepared with either ion-beam etching or with immersion in hydrofluoric acid at concentrations ranging from about 0.1 wt % to about 50 wt % HF in water.

Electrochemical Reactor

An electrochemical reactor for extracting metals from waste materials includes a flow cell. The flow cell includes a plurality of electrodes in a closed loop or partially closed loop configuration. The electrodes may be one or more cathodes and/or one or more anodes.

Figure 2:
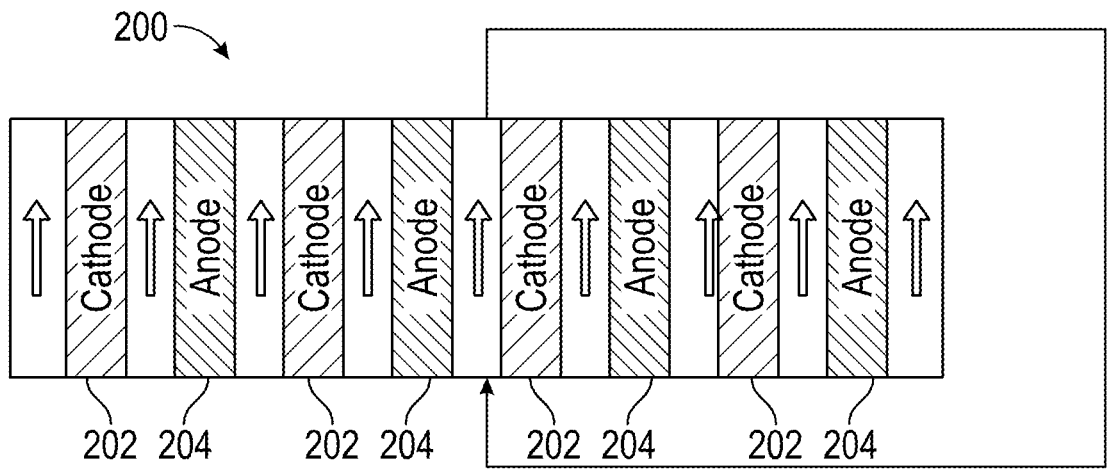
FIG. 2 is a top view schematic of another example of an electrochemical reactor for extracting metals from a metal or mineral containing mixture/solution.
Figure 3A:
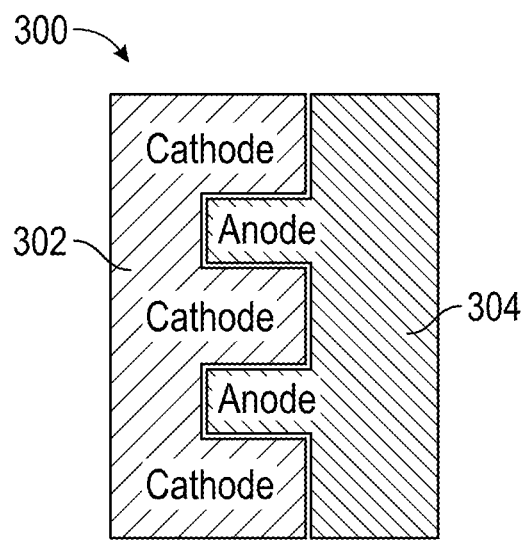
FIG. 3A is a schematic illustration of the top view of an assembled flow cell with interdigitated electrodes in one embodiment of the present disclosure.

In some aspects, the electrochemical reactor can have a plurality of alternating anodes and cathodes. FIG. 1 illustrates an example electrochemical reactor 100 where the cathodes 102 and anodes 104 can be arranged in a series flow configuration. The flow of the metal or mineral containing solution may alternate directions, as illustrated by the arrows in FIG. 1, as it flows between the plurality of alternating cathodes 102 and anodes 104. FIG. 2 illustrates an example electrochemical reactor 200 where the cathodes 202 and anodes 204 can be arranged in a parallel flow configuration. The flow of the metal or mineral containing solution may be in the same direction, as illustrated by the arrows in FIG. 2, as it flows between the plurality of alternating cathodes and anodes. In various examples, the electrochemical reactor may include 1, 2, 3, 4, 5, or more anodes and 1, 2, 3, 4, 5, or more cathodes. The electrochemical reactor may include about 1 to 5, about 5 to 10, about 10 to 50, about 50 to 100, about 100 to 500, or about 500 to 100 anodes/cathodes. The electrochemical reactor may include the same number of anodes and cathodes. For example, the electrochemical reactor may include 4 anodes and 4 cathodes in an alternating in a parallel flow configuration. In another example, the electrochemical reactor may include 4 anodes and 4 cathodes alternating in a series flow configuration. In another example, the electrochemical reactor may include a different number of anodes and cathodes. In yet another example, the electrochemical reactor 300 may include an interdigitated cathode 302 and an interdigitated anode 304, as illustrated in FIG. 3A.

Figure 4A:
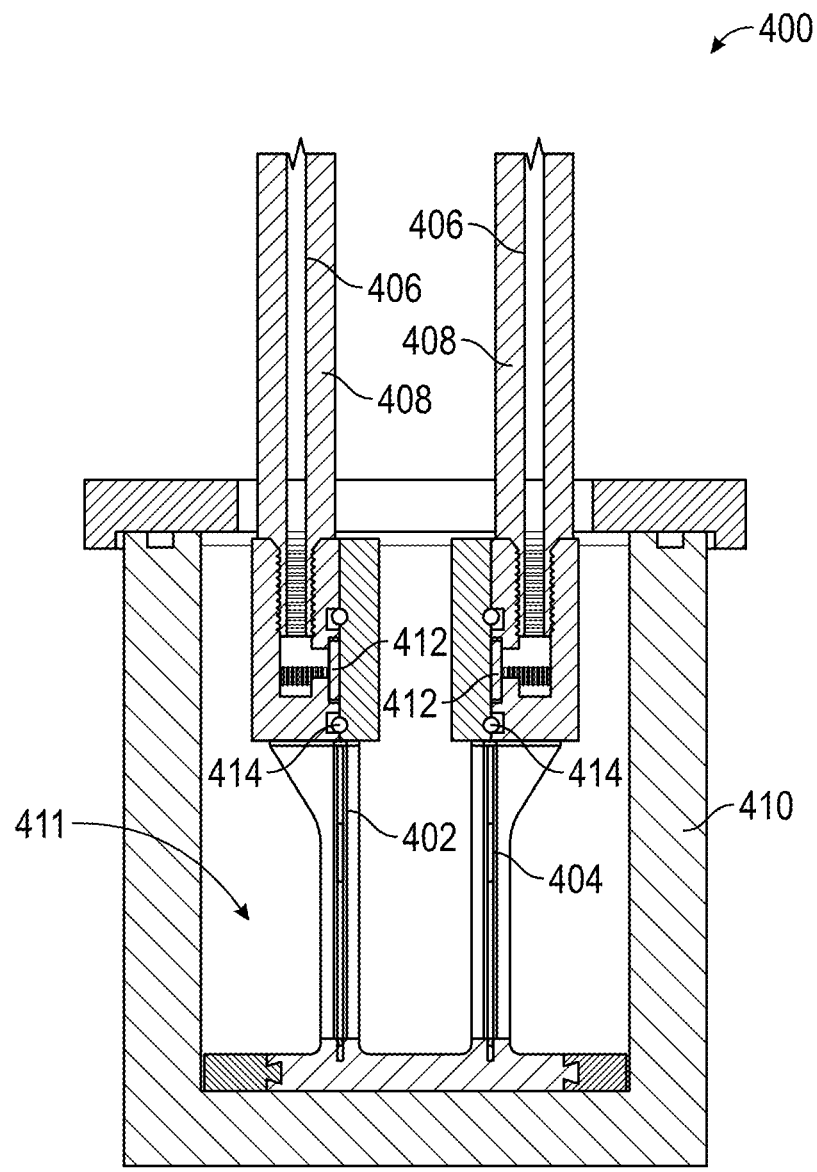
FIG. 4A is a cross sectional schematic of a silicon anode-cathode pairing within a flow cell/reactor.

FIG. 4A is a cross sectional schematic of an example electrochemical reactor 400 with a single a silicon anode-cathode pairing. The electrochemical reactor 400 may include an anode 402, a cathode 404, an electrified lead 406 within an electrode holder 408 for each of the anode 402 and the cathode 404, and a housing 410 forming a flow cell 411. The electrode holders 408 may further include conductive metal pads 412 and O-rings 414 for securing the leads 406 to the anode 402 or cathode 404. The electrified lead 406 may be electrically connected to a power supply (not shown) and the anode 402 or the cathode 404, via the conductive metal pads 412. The housing 410 of the electrochemical reactor 400 may further include an inlet 416 for the metal or mineral containing solution, an outlet 418 for the metal or mineral containing solution, and one or more openings 420 for sensor insertion.

The electrochemical reactor 400 may include one or more sensors (not shown). Non-limiting examples of sensors include pH sensors, conductivity sensors, temperature sensors, UV-visible spectroscopy sensors, oxidation-reduction potential (ORP) sensors, x-ray fluorescence (XRF) sensors, pressure sensors, flow sensors, liquid level sensors, inductively coupled plasma (ICP) sensors, and specific detectors for hazards like Cl, Br, or F that could be generated as by-products. In some examples, one or more of the sensors may sit directly in the cell. In other examples, a small volume of the stream may be routed out of the main process flow and through a connected instrument containing one or more of the sensors. In some examples, one or more of the sensors may be used to inform adjusting the voltage within the flow cell in a feedback loop to improve the selectively for the target material.

Figure 4B:
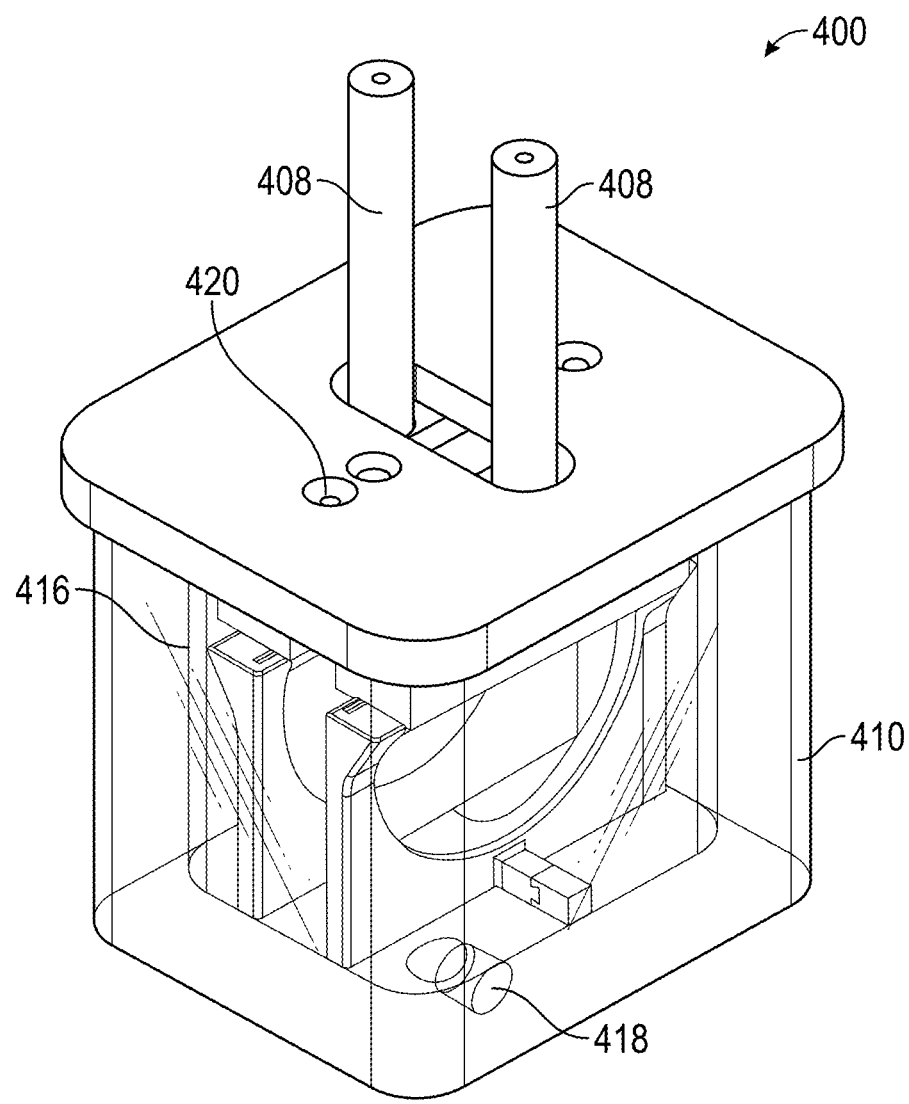
FIG. 4B shows an alternate view of the same cell/reactor as in FIG. 4A.

In an example, the reactor shown in FIG. 4A may be a subunit of a much larger cell by multiplying the anode/cathode pairs repeatedly. FIG. 4B shows an alternate view of the same cell/reactor as in FIG. 4A.

Figure 5A:
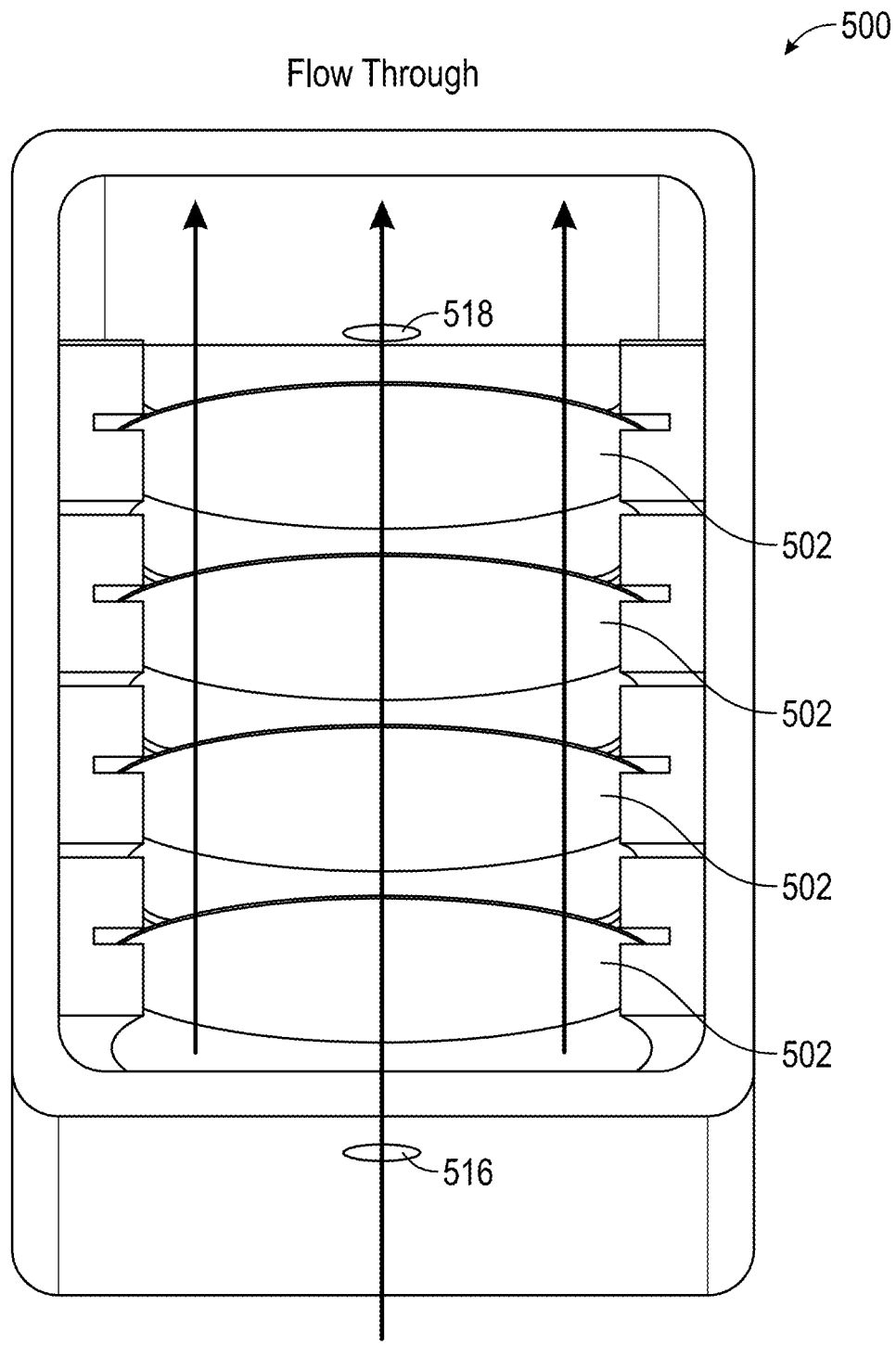
FIG. 5A shows an example flow path of a solution/mixture through silicon electrodes in an electrochemical reactor.
Figure 5B:
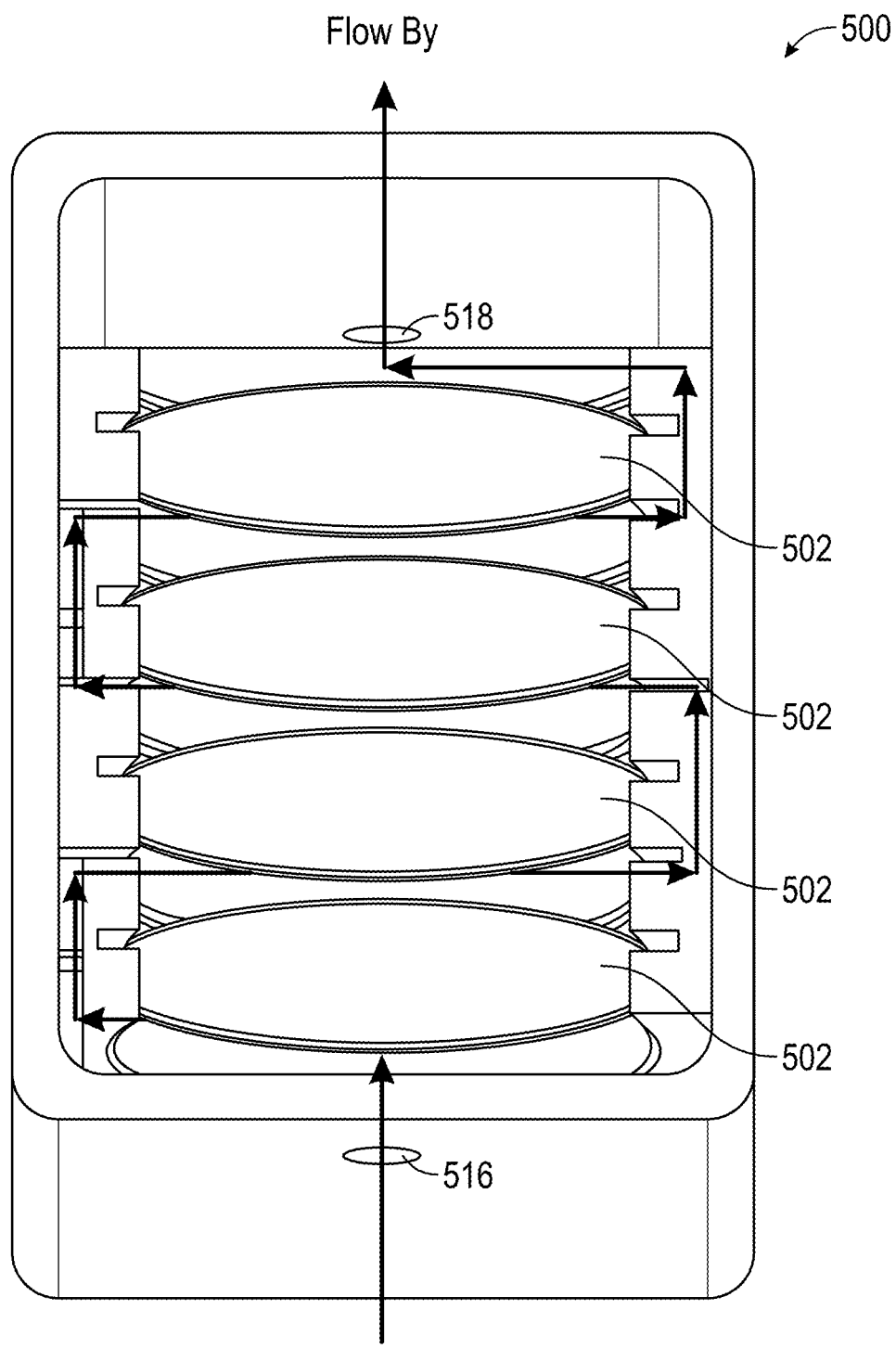
FIG. 5B shows an example flow path of a solution/mixture around silicon electrodes in an electrochemical reactor.

In some aspects, the electrochemical reactor is configured for the metal or mineral containing solution to pass between or through the plurality of electrodes. FIGS. 5A and 5B show example flow paths of a solution/mixture through (FIG. 5A) or around (FIG. 5B) silicon electrodes in an electrochemical reactor. Referring to FIG. 5A, the metal or mineral containing solution enters the electrochemical reactor 500 through inlet 516, through the porous electrodes 502, and out the outlet 518. Referring to FIG. 5B, the metal or mineral containing solution enters the electrochemical reactor 500 through inlet 516, around the non-porous electrodes 502, and out the outlet 518.

The anodes and/or cathodes may be porous or non-porous. In some examples, if the electrodes are porous the mixture/solution may pass through the pores in the electrode (e.g. FIG. 5A) and the target metal may be deposited within the pores. The pores in the porous electrodes may range in size from about 1 μm to about 1 cm, about 1 μm to about 100 μm, about 100 μm to about 1 mm, about 1 mm to about 2 mm, about 2 mm to about 3 mm, about 3 mm to about 4 mm, about 4 mm to about 5 mm, about 5 mm to about 6 mm, about 6 mm to about 7 mm, about 7 mm to about 8 mm, about 8 mm to about 9 mm, or about 9 mm to about 1 cm. In other examples, if the electrodes are non-porous, the mixture/solution may pass along the surface of the electrodes, between the at least one anode and the at least one cathode (e.g., FIG. 5B). In some examples, the flow of the metal or mineral containing solution is orthogonal to the applied voltage if passing between non-porous electrodes. In further examples, the flow of the metal or mineral containing solution is parallel to the applied voltage if passing through porous electrodes.

In some aspects of the electrochemical reactor, the anode and cathode may comprise silicon, carbon, stainless-steel, ferro-alloys, lead-alloys, or combinations thereof. In an embodiment, at least one of the anode or cathodes may be silicon. In at least one example, at least one anode and at least one cathode include silicon. Without being limited to any one theory, silicon electrodes may reduce $H_2$ gas evolution as compared to standard stainless-steel electrodes, leading to improved efficiency. In various aspects, silicon electrodes may be up to 1%, up to 5%, up to 10%, up to 15%, up to 20%, or more than 20% more efficient than stainless-steel electrodes with respect to recovering a target metal from a highly acidic (pH<2.0) solution. For example, a silicon cathode may be about 20% more efficient than stainless-steel cathodes in extracting copper (with respect to KWh/kg) from an acidic solution containing multiple metals and salts.

In an embodiment, the electrodes may only include monolithic silicon. Therefore, the electrode may be a single, continuous piece of silicon. The monolithic silicon electrode may be modified to be porous. In some examples, the electrode only includes a porous monolithic silicon body with no further layers or coatings (i.e., wherein the monolithic silicon body is devoid of coatings). In an example, the electrode may be unlayered. In another example, the electrode is substantially free from elements other than silicon. In yet another example, the electrode is pure silicon. In a further example, the monolithic structure is not encumbered or blocked with non-silicon components. In an example, the silicon is substantially free to interact with ions. Alternatively, the silicon body may include multiple pieces (e.g., layers of silicon, layers of silicon with other materials, coatings, etc.). In various examples, the electrode may comprise at least 98 wt. %, at least 99 wt. %, at least 99.5 wt. %, at least 99.9 wt. %, or 100 wt. % silicon.

In some embodiments of the present disclosure, the silicon anode or cathode is N-type doped with a group V element. In some embodiments the element is phosphorous or arsenic. In some embodiments, the silicon anode or cathode is P-type doped with boron. In some embodiments, the silicon anode and/or cathode is a wafer or a plate. For example, the electrodes in the electrochemical reactor may be monolithic silicon wafers. In some embodiments, the silicon surface is roughened, porous, non-porous, polished, or combinations thereof. Non-porous electrodes are easier to manufacture but porous electrodes provide more surface area. The surface may be treated by mechanical roughening, laser cut, metal assisted chemical etching, sandblasting, or a combination thereof. Roughening creates increased surface area for plating to occur, and better adhesion of plated materials to the electrodes. The roughness ($R_z$) of the electrodes may range from about 1 nm to about 10 μm, about 1 nm to about 1 μm (e.g., smooth/polished silicon), about 2 μm to about 5 μm (e.g., rough, unpolished silicon), about 3 μm to about 10 μm (e.g., laser roughened silicon), or about 1 μm to about 10 μm (e.g., sandblasted silicon). In some examples, the roughness of the electrodes may be measured by a profilometer.

In some embodiments, the silicon anode and/or cathode may be coated or functionalized with one or more coating materials that serve to enhance the durability, efficiency, and performance of the electrodes. For example, without being limited to any one theory, the coating may improve the electrochemical stability of the electrode material over time, leading to longevity and higher electrochemical efficiency and coating a silicon anode acts to lower the anode voltage, thereby increasing extraction efficiency. In some examples, both the anode and cathode may be coated, the anode may be coated and the cathode may not be coated, the cathode may be coated and the anode may be coated, or both the anode and the cathode may be coated.

Figure 6A:
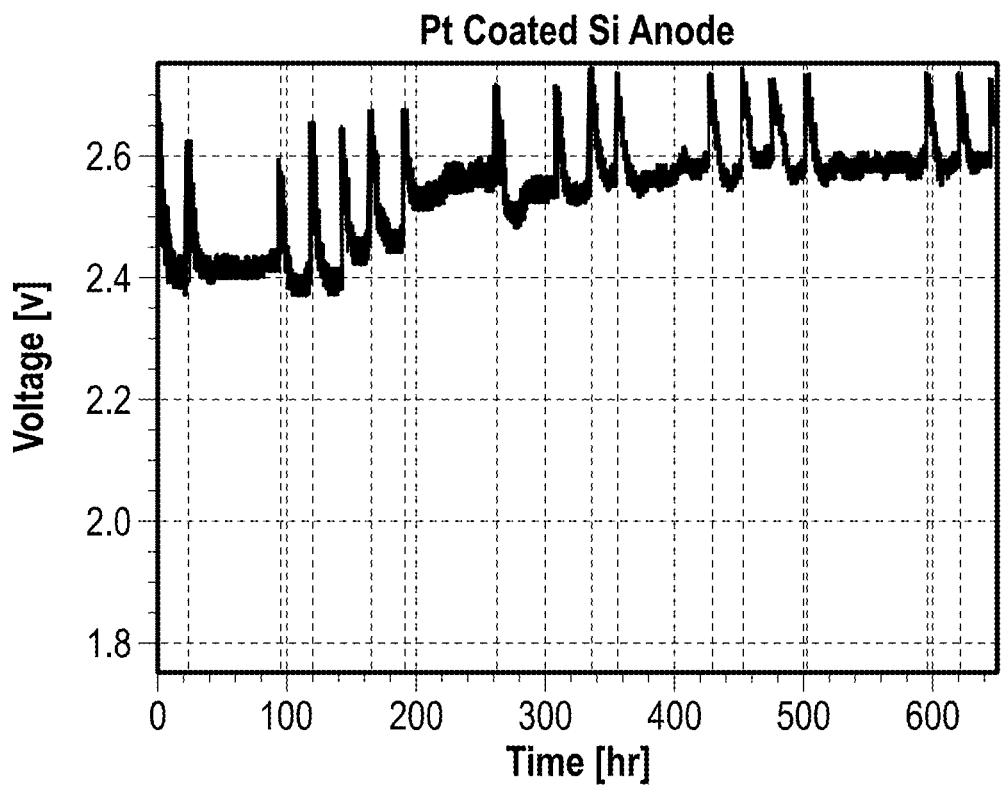
FIG. 6A is a graph of an example Pt coated Si anode with respect to voltage over time in a relevant operating environment.
Figure 6B:
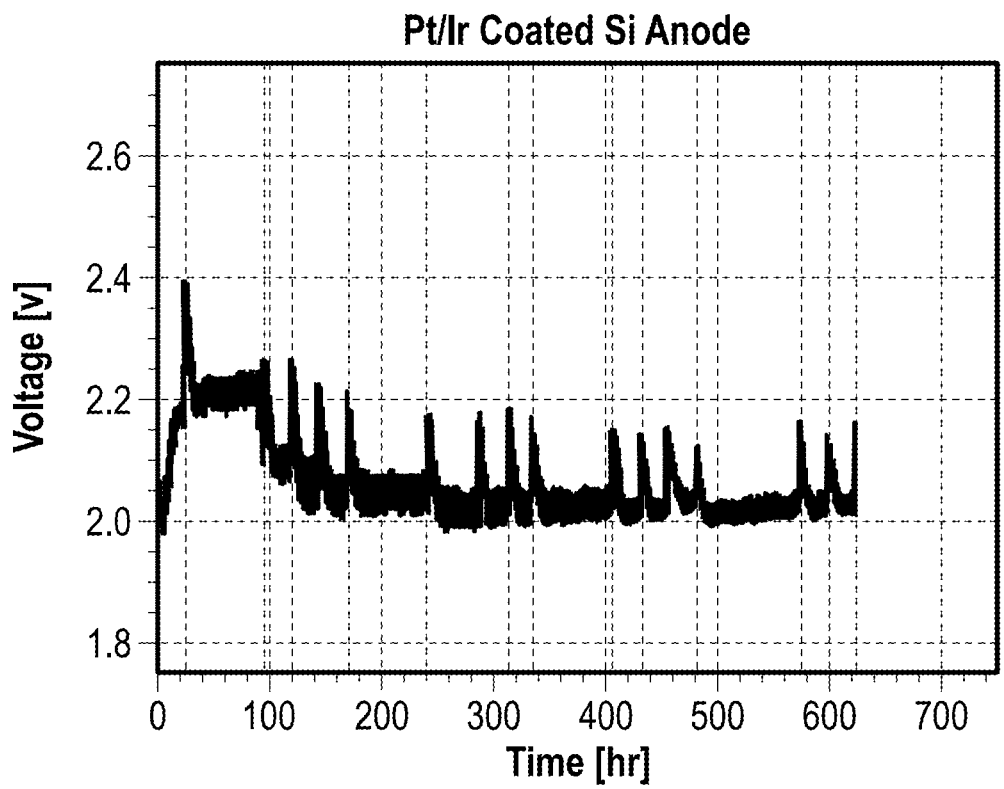
FIG. 6B is a graph of an example Pt/Ir coated Si anode with respect to voltage over time in a relevant operating environment.

FIGS. 6A and 6B are comparisons of a Pt coated Si anode (FIG. 6A) compared to a Pt/Ir coated Si anode (FIG. 6B) with respect to voltage over time in a relevant operating environment. The greater stability of the coated anode leads to longevity, and the lower voltage to higher efficiency. The stability of the coated electrode may be maintained for an extended period of time. For example, a coated silicon electrode may maintain voltage stability (e.g. the voltage may not exceed the initially applied voltage) for at least 100 hours, at least 200 hours, at least 300 hours, at least 400 hours, at least 500 hours, at least 600 hours, or at least 700 hours.

The coating materials may include, but are not limited to Ti, Ni, Co, Cu, Ag, Pt, Pd, Au, Ir, Hf, Pb, Sb, Ca, Ru, Rh, C, W, Bi, or combinations thereof. For example, the coating materials may include, but are not limited to Ti, Ni, Co, Cu, Ag, Pt, Pd, Au, Ir, Hf, Pb, Sb, Ca, Ru, Rh, or combinations thereof. The coating materials may be present as metals or compounds such as oxides or silicides. For example, the coating may be a coating of Ti/Ni, Ti/Co, Ti/Cu, Ti/Ag, Ti/Pt, Ti/Pd, Ti/Au, Ti/Ir, Ti/Hf, Ti/Pb, Ti/Pb, Ti/Sb, Ti/Ca, Ti/Ru, Ti/Rh, Ni/Co, Ni/Cu, Ni/Ag, Ni/Pt, Ni/Pd, Ni/Au, Ni/Ir, Ni/Hf, Ni/Pb, Ni/Sb, Ni/Ca, Ni/Ru, Ni/Rh, Co/Cu, Co/Ag, Co/Pt, Co/Pd, Co/Pd, Co/Au, Co/Ir, Co/Hf, Co/Pb, Co/Sb, Co/Ca, Co/Ru, Co/Rh, Cu/Ag, Cu/Pt, Cu/Pd, Cu/Au, Cu/Ir, Cu/Hf, Cu/Pb, Cu/Sb, Cu/Ca, Cu/Ru, Cu/Rh, Ag/Pt, Ag/Pd, Ag/Au, Ag/Ir, Ag/Hf, Ag/Pb, Ag/Sb, Ag/Ca, Ag/Ru, Ag/Rh, Pt/Pd, Pt/Au, Pt/Ir, Pt/Hf, Pt/Pb, Pt/Sb, Pt/Ca, Pt/Ru, Pt/Rh, Pd/Au, Pd/Ir, Pd/Hf, Pd/Pb, Pd/Sb, Pd/Ca, Pd/Ru, Pd/Rh, Au/Ir, Au/Hf, Au/Pb, Au/Sb, Au/Ca, Au/Ru, Au/Rh, Ir/Hf, Ir/Pb, Ir/Sb, Ir/Ca, Ir/Ru, Ir/Rh, Hf/Pb, Hf/Sb, Hf/Ca, Hf/Ru, Hf/Rh, Pb/Sb, Pb/Ca, Pb/Ru, Pb/Rh, Sb/Ca, Sb/Ru, Sb/Rh, Ca/Ru, Ca/Rh, Ru/Rh, Pt/Ni, Pt/Pb/Sb, Pt/Pb/Sb/Ca, Pt/Ir, Pt/Ru, Pt/Bi, Pt/W, Au/Ni, Au/Pb/Sb, Au/Pb/Sb/Ca, Au/Ir, Au/Ru, Au/Ni, Au/W, Au/Bi, C/Ni, Cu/Pb/Sb, C/Pb/Sb/Ca, C/Ir, C/Ru, C/W, or C/Bi. In an example, the coating may be Pt/N. In an example, the coating may be Pt/Pb/Sb. In an example, the coating may be Pt/Pb/Sb/Ca. In an example, the coating may be Pt/Ir. In an example, the coating may be Pt/Ru. In an example, the coating may be Pt/Bi. In an example, the coating may be Pt/W. In an example, the coating may be Au/Ni. In an example, the coating may be Au/Pb/Sb. In an example, the coating may be Au/Pb/Sb/Ca. In an example, the coating may be Au/Ir. In an example, the coating may be Au/Ru. In an example, the coating may be Au/Ni. In an example, the coating may be Au/W. In an example, the coating may be Au/Bi. In an example, the coating may be C/Ni. In an example, the coating may be Cu/Pb/Sb. In an example, the coating may be C/Pb/Sb/Ca. In an example, the coating may be C/Ir. In an example, the coating may be C/Ru. In an example, the coating may be C/W. In an example, the coating may be C/Bi.

Many of the coating materials are very expensive and thus their use is not scalable. Therefore, instead of using these materials for the full electrode material, using only a thin coating on a silicon electrode leverages the properties of the coating material without the cost or scalability issues. The thickness of the material coatings can range from about 0.5 nm to about 500 nm. For example, a coating of one or more coating materials on a silicon anode or a silicon cathode may have a thickness of about 0.5 nm to about 1 nm, about 1 nm to about 10 nm, about 10 nm to about 50 nm, about 50 nm to about 100 nm, about 100 nm to about 150 nm, about 150 nm to about 200 nm, about 200 nm to about 250 nm, about 250 nm to about 300 nm, about 300 nm to about 350 nm, about 350 nm to about 400 nm, about 400 nm to about 450 nm, or about 450 nm to about 500 nm. In at least one example, the coating may have a thickness of about 50 nm to about 100 nm.

In some embodiments, the silicon has a resistivity from about 0.0001 ohm·cm to about 100 ohm·cm. For example, the resistivity may be from about 0.001 ohm·cm to about 0.005 ohm·cm, 0.0005 ohm·cm to about 95 ohm·cm, about 0.001 ohm·cm to about 90 ohm·cm, about 0.005 ohm·cm to about 85 ohm·cm, about 0.001 ohm·cm to about 80 ohm·cm, about 0.05 ohm·cm to about 75 ohm·cm, about 0.01 ohm·cm to about 70 ohm·cm, about 0.5 ohm·cm to about 65 ohm·cm, about 0.1 ohm·cm to about 60 ohm·cm, about 1.0 ohm·cm to about 55 ohm·cm, about 1.5 ohm·cm to about 50 ohm·cm, about 2.0 ohm·cm to about 45 ohm·cm, about 2.5 ohm·cm to about 40 ohm·cm, about 3.0 ohm·cm to about 35 ohm·cm, about 3.5 ohm·cm to about 30 ohm·cm, about 4.0 ohm·cm to about 25 ohm·cm, about 4.5 ohm·cm to about 20 ohm·cm, about 5.0 ohm·cm to about 15 ohm·cm, about 5.5 ohm·cm to about 10 ohm·cm, about 6.0 ohm·cm to about 9.0 ohm·cm, or about 7.0 ohm·cm to about 8.0 ohm·cm. In some examples, the resistivity may be measured using a 4-pt probe.

In some embodiments of the present disclosure, the silicon electrodes may be reusable. The metal may be recovered from the electrodes either in situ within the flow cell or within separate recovery tanks. In some aspects, the target metal or mineral is electrochemically refined by pairing the silicon electrode coated with the recovered material in an electrochemical cell with a counter-electrode. The recovered target metal migrates selectively from the electrodes to the counter-electrode, thereby further purifying the target metal and regenerating the silicon for further use. In an aspect, the counter-electrode may be composed of the target material. In an aspect, the counter-electrode may comprise the pure target metal. For example, a silicon electrode electrodeposited with copper following recovery would be place in an electrochemical cell with a counter-electrode made of pure copper foil, and the recovered copper would migrate selectively from the silicon to the pure copper, thereby further purifying it and regenerating the silicon for further use. In other aspects, the counter-electrode for recovery may not include the same material as the recovered target material but may still selectively recover the target material. A counter-electrode with either the same or different material than the target material may be configured accomplish both removal of the target material from the Si and also increase purity (e.g., electro-refining).

In some embodiments of the present disclosure, one of the anode or cathode may include carbon. In some examples, the carbon may be graphitic, vitreous, or combinations thereof. In other embodiments, the carbon may be felt, paper, or plate.

In some aspects of the disclosure, the space between consecutive electrodes can be from about 0.1 cm to about 100 cm. For example, the space can be from about 0.1 cm to about 100 cm, about 0.5 cm to about 90 cm, about 1 cm to about 80 cm, about 1.5 cm to about 70 cm, about 2 cm to about 60 cm, about 2.5 cm to about 50 cm, about 3 cm to about 40 cm, about 3.5 cm to about 30 cm, about 4 cm to about 20 cm, about 4.5 cm to about 10 cm, about 5 cm to about 8.0 cm, from about 0.6 cm to about 7 cm, about 0.1 cm to about 1 cm, about 1 cm to about 5 cm, about 5 cm to about 10 cm, about 10 cm to about 20 cm, about 20 cm to about 30 cm, about 30 cm to about 40 cm, about 40 cm to about 50 cm, about 50 cm to about 60 cm, about 60 cm to about 70 cm, about 70 cm to about 80 cm, about 80 cm to about 90 cm, or about 90 cm to about 100 cm.

In some aspects of the disclosure, the thickness of the electrodes can be from about 0.2 mm to about 1 cm. For example, the thickness can be from about 0.3 mm to about 9.5 mm, about 0.4 mm to about 9.0 mm, about 0.5 mm to about 8.5 mm, about 0.6 mm to about 8.0 mm, about 0.7 mm to about 7.5 mm, about 0.8 mm to about 7.0 mm, about 0.9 mm to about 6.5 mm, about 1.0 mm to about 6.0 mm, about 1.5 mm to about 5.5 mm, about 2.0 mm to about 5.0 mm, about 2.5 mm to about 4.5 mm, about 3.0 mm to about 4.0 mm, about 3.2 mm to about 3.8 mm, about 0.2 mm to about 1 mm, about 1 mm to about 3 mm, about 2 mm to about 4 mm, about 3 mm to about 5 mm, about 4 mm to about 6 mm, about 5 mm to about 7 mm, about 6 mm to about 8 mm, about 7 mm to about 9 mm, about 8 mm to about 10 mm, about 10 mm to 15 mm, about 15 mm to 20 mm, about 20 mm to about 25 mm, about 25 mm to about 30 mm, about 30 mm to about 35 mm, about 35 mm to about 40 mm, about 40 mm to about 45 mm, about 45 mm to about 50 mm, about 50 mm to about 55 mm, about 55 mm to about 60 mm, about 60 mm to about 65 mm, about 65 mm to about 70 mm, about 70 mm to about 75 mm, about 75 mm to about 80 mm, about 80 mm to about 85 mm, about 85 mm to about 90 mm, about 90 mm to about 95 mm, or about 95 mm to about 1 cm.

In an embodiment, the electrodes are interdigitated for quick removal and recovery. FIG. 3A shows an example interdigitated cathode and an interdigitated anode. In some embodiments, the interdigitated cathode and interdigitated anode are comb-shaped arrays that interlock together. Each interdigitated electrode may have 1, 2, 3, 4, 5, or more prongs, such that the prongs of the interdigitated cathode and interdigitated anode alternate. In some embodiments, the interdigitated electrodes may have the same or different number of prongs. In various examples, the gaps between the prongs may be the same distance between consecutive electrodes as described above.

Figure 3B:
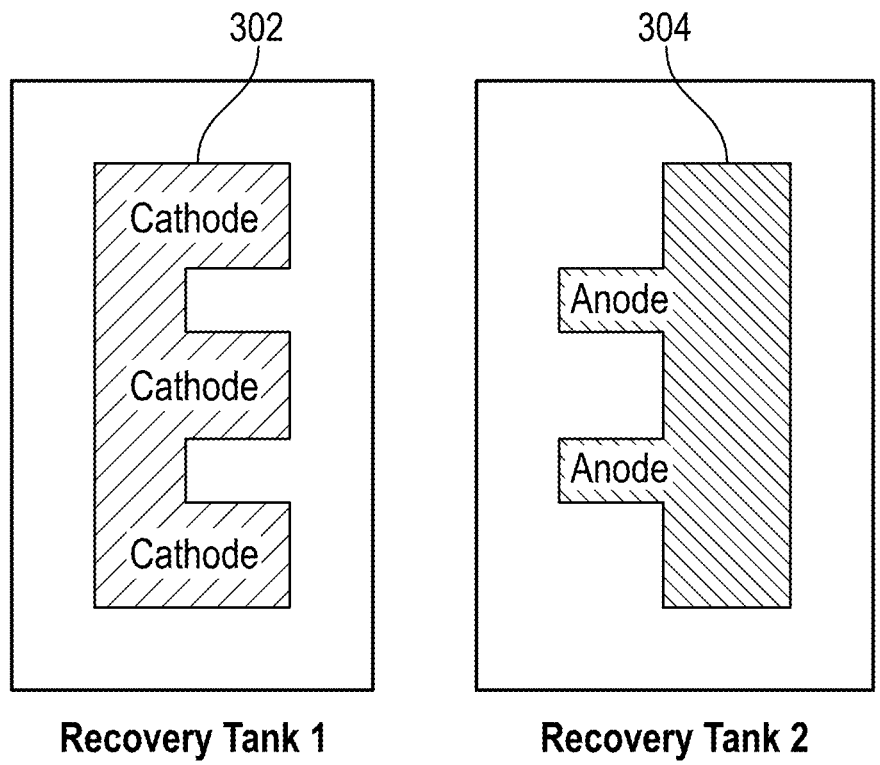
FIG. 3B is a schematic illustration of separated electrodes for metal recovery in one embodiment of the present disclosure.

In some aspects, the electrochemical reactor may be easily assembled and easily disassembled. For example, the interdigitated electrodes may be easily separated from one another and placed in separate recovery tanks for recovery of the electroplated metal or metal oxide, as illustrated in FIG. 3B.

In some embodiments, the electrochemical reactor may further include a voltage source connected to the electrodes. In some aspects, the voltage applied between the anode and the cathode ranges from between about 0.1 to about 5 V. When the voltage is applied between the electrodes, an electric field is generated such that the electric field facilitates the target metal or metal oxide electroplating onto the cathode and/or anode. The electric field is adjustable to select for the desired metal.

In some examples, the voltage may be about 0.1 V to about 20 V. For example, the voltage may be about 0.1 V to about 0.5 V, about 0.5 V to about 1 V, about 1 V to about 1.5 V, about 1.5 V to about 2 V, about 2 V to about 2.5 V, about 2.5 V to about 3 V, about 3 V to about 3.5 V, about to 3.5 V to about 4 V, about 4 V to about 4.5 V, about 4.5 V to about 5 V, about 5 V to about 6 V, about 6 V to about 7 V, about 7 V to about 8 V, about 8 V to about 9 V, about 9 V to about 10 V, about 10 V to about 11 V, about 11 V to about 12 V, about 12 V to about 13 V, about 13 V to about 14 V, about 14 V to about 15 V, about 15 V to about 16 V, about 16 V to about 17 V, about 17 V to about 18 V, about 18 V to about 19 V, about 19 V to about 20 V. In certain aspects, the current density ranges from about 0 to about 2 A cm$^{-2}$. In some examples, the current density may be 0.1 A cm$^{-2}$, 0.2 A cm$^{-2}$, 0.3 A cm$^{-2}$, 0.4 A cm$^{-2}$, 0.5 A cm$^{-2}$, 0.6 A cm$^{-2}$, 0.7 A cm$^{-2}$, 0.8 A cm$^{-2}$, 0.9 A cm$^{-2}$, 1.0 A cm$^{-2}$, 1.1 A cm$^{-2}$, 1.2 A cm$^{-2}$, 1.3 A cm$^{-2}$, 1.4 A cm$^{-2}$, 1.5 A cm$^{-2}$, 1.6 A cm$^{-2}$, 1.7 A cm$^{-2}$, 1.8 A cm$^{-2}$, 1.9 A cm$^{-2}$, or 2.0 A cm$^{-2}$.

In some embodiments, the electrochemical reactor may further include an external source such as a heating coil or other heating mechanism known in the art. The heating source may be configured to heat the electrochemical reactor to a temperature ranging from about 0° C. to about 120° C., about 0° C. to about 10° C., about 10° C. to about 20° C., about 20° C. to about 30° C., about 30° C. to about 40° C., about 40° C. to about 50° C., about 50° C. to about 60° C., about 60° C. to about 70° C., about 70° C. to about 80° C., about 80° C. to about 85° C., about 85° C. to about 90° C., about 90° C. to about 95° C., about 95° C. to about 100° C., about 100° C. to about 110° C., or about 110° C. to about 120° C.

Method

A method for extracting metals from waste materials may include: feeding a mixture or metal or mineral containing solution into an electrochemical reactor having a plurality of electrodes; flowing the metal containing solution through the plurality of electrodes; applying a voltage between the plurality of electrodes to transfer a target metal from the mixture or metal containing solution to the electrodes by electrowinning; depositing the target metal or the target metal oxide on the electrodes; and recovering the target metal or the target metal oxide by mechanical separation, chemical separation, electrochemical separation, or a combination thereof. In some aspects, the method may further include assembling an electrochemical reactor with a flow cell having a plurality of electrodes. In other aspects, the electrochemical reactor may already be assembled with the plurality of electrodes.

The target metals or minerals may include but are not limited to lithium, manganese, cobalt, nickel, copper, lead, zinc, silver, cadmium, precious metals (e.g., gold, silver), platinum group metals (e.g., platinum, palladium, rhodium, ruthenium, osmium, iridium, rhenium), rare earth elements (e.g., lanthanum, cerium, praseodymium, neodymium, promethium, samarium, europium, gadolinium, terbium, dysprosium, holmium, erbium, thulium, ytterbium, lutetium, scandium, and yttrium), mercury, thallium, selenium, bismuth, lead, uranium, polonium, oxides or hydroxides thereof, or combinations thereof.

The electrodes of the present disclosure are described above. In some aspects, the method may further include coating the plurality of electrodes prior to feeding the metal or mineral containing solution into the electrochemical reactor. A silicon electrode material may be coated with a coating material. The coating material may include but is not limited to titanium, nickel, cobalt, copper, silver, platinum, palladium, gold, iridium, hafnium, ruthenium, rhodium, lead, calcium, antimony, combinations thereof, and oxides or silicides thereof (e.g., $M_xO_y$ or $M_xSi_y$, where M is the metal and x and y can vary depending the stoichiometry for the metal used in the coating). The thickness of these materials can range from 0.5 nm to 500 nm.

The coating materials may be deposited by physical vapor deposition (e.g., magnetron sputtering, electron beam evaporation, thermal evaporation, pulsed laser deposition), electroplating, ion implantation, thermal spray deposition, or chemical vapor deposition. In at least one example, the coating materials are deposited by magnetron sputtering, which may provide throughput/scalability and controllability, where the thickness can be varied with high accuracy over a large range. In some aspects, the steps for coating may include, but are not limited to roughening the Si surface (via laser rastering or sand blasting), cleaning the Si surface either with immersion in hydrofluoric acid (wet chemical treatment) or oxygen/hydrogen plasma (ion-beam etching), followed by the sputtering deposition or other deposition method. The roughening may help with adhesion of the coating materials onto the electrode, and later may help with adhesion of the target materials being extracted. Optionally, the coating may then be further refined by thermal annealing.

The hydrofluoric acid (HF) used for cleaning the Si surface prior to deposition may be at concentrations ranging from about 0.1 wt. % to about 50 wt. %, about 0.1 wt. % to about 1 wt. %, about 1 wt. % to about 5 wt. %, about 5 wt. % to about 10 wt. %, about 10 wt. % to about 15 wt. %, about 15 wt. % to about 20 wt. %, about 20 wt. % to about 25 wt. %, about 25 wt. % to about 30 wt. %, about 30 wt. % to about 35 wt. %, about 35 wt. % to about 40 wt. %, about 40 wt. % to about 45 wt. %, or about 45 wt. % to about 50 wt. % HF in water.

In an aspect, the mixture or metal containing solution may be acidic. In one aspect, the metal containing waste solution may have a pH of from about −1 to about 10.0, about −1 to about 2.0, about 1.0 to about 3.0, about 2.0 to about 4.0, about 3.0 to about 5.0, about 4.0 to about 6.0, about 5.0 to about 7.0, about 6.0 to about 8.0, about 7.0 to about 9.0, or about 8.0 to about 10.0.

The mixture may contain the target metal and a solvent. In an aspect, the solvent may be an acid. In one aspect of the method, acid may be added to the metal containing solution. The acid includes but is not limited to sulfuric acid, hydrochloric acid, nitric acid, or combinations thereof. For example, the pH of the acid may be less than 7, less than 6, less than 5, less than 4, less than 3, less than 2, less than 1, or less than 0.5.

In some aspects of the method, the voltage applied between the anode and the cathode ranges from between about 0.1 to about 20 V. For example, the voltage may be about 0.1 V to about 0.5 V, about 0.5 V to about 1 V, about 1 V to about 1.5 V, about 1.5 V to about 2 V, about 2 V to about 2.5 V, about 2.5 V to about 3 V, about 3 V to about 3.5 V, about to 3.5 V to about 4 V, about 4 V to about 4.5 V, about 4.5 V to about 5 V, about 5 V to about 6 V, about 6 V to about 7 V, about 7 V to about 8 V, about 8 V to about 9 V, about 9 V to about 10 V, about 10 V to about 11 V, about 11 V to about 12 V, about 12 V to about 13 V, about 13 V to about 14 V, about 14 V to about 15 V, about 15 V to about 16 V, about 16 V to about 17 V, about 17 V to about 18 V, about 18 V to about 19 V, about 19 V to about 20 V. When the voltage is applied between the electrodes, an electric field is generated such that the electric field facilitates the electroplating of metal ions onto the electrodes. The electric field is adjustable to select for the desired target material. Selectivity may be based on the electrochemical potential of reduction for target materials. To arrive at the ideal voltage for extraction of a particular target material, feedback loops may be used to adjust or improve the voltage based on sensor data in real time.

In certain aspects, the current density ranges from about 0 to about 2 A $cm^{-2}$. In some examples, the current density may be 0.1 A $cm^{-2}$, 0.2 A $cm^{-2}$, 0.3 A $cm^{-2}$ 0.4 A $cm^{-2}$, 0.5 A $cm^{-2}$, 0.6 A $cm^{-2}$, 0.7 A $cm^{-2}$, 0.8 A $cm^{-2}$, 0.9 A $cm^{-2}$, 1.0 A $cm^{-2}$, 1.1 A $cm^{-2}$, 1.2 A $cm^{-2}$, 1.3 A $cm^{-2}$, 1.4 A $cm^{-2}$, 1.5 A $cm^{-2}$, 1.6 A $cm^{-2}$, 1.7 A $cm^{-2}$, 1.8 A $cm^{-2}$, 1.9 A $cm^{-2}$ or 2.0 A $cm^{-2}$.

In some aspects of the method, the voltage is applied for a time ranging from 0.5 hour to 24 hours, about 0.5 hour to 1 hour, about 1 hour to 6 hours, about 6 hours to 12 hours, about 12 hours to 24 hours, about 24 hours to about 144 hours, about 24 hours to about 48 hours, about 48 hours to about 72 hours, about 72 hours to about 96 hours, about 96 hours to about 120 hours, or about 120 hours to about 144 hours. In some aspects of the method, the voltage is applied semi-continuously, with brief pauses to recover the metal product. In other aspects, the voltage is applied continuously for a cycle, with the metal product recovered between cycles. Recovery may include mechanical (scraping), ultrasonication, chemical, or electrochemical recovery. In some examples, a whole rack of electrodes may be lifted out of the reactor for product recovery, or the recovery could be done in situ within the reactor. Mechanical recovery may be on the order of minutes, while electrochemical recovery or electro-refining may be on the order of hours.

In some aspects, the metal or mineral containing solution is circulated continuously through the flow cell while the voltage is applied. For example, the metal or mineral containing solution may be continuously recirculated through the flow cell for about 0.5 hour to 24 hours, about 0.5 hour to 1 hour, about 1 hour to 6 hours, about 6 hours to 12 hours, about 12 hours to 24 hours, about 24 hours to about 144 hours, about 24 hours to about 48 hours, about 48 hours to about 72 hours, about 72 hours to about 96 hours, about 96 hours to about 120 hours, or about 120 hours to about 144 hours.

Heat may be applied to the electrochemical reactor via an external source such as a heating coil or other heating mechanism known in the art. In some aspects of the present disclosure, the temperature ranges from about 0° C. to about 120° C. In some examples, the temperature may be about 0° C. to about 120° C., about 0° C. to about 10° C., about 10° C. to about 20° C., about 20° C. to about 30° C., about 30° C. to about 40° C., about 40° C. to about 50° C., about 50° C. to about 60° C., about 60° C. to about 70° C., about 70° C. to about 80° C., about 80° C. to about 85° C., about 85° C. to about 90° C., about 90° C. to about 95° C., about 95° C. to about 100° C., about 100° C. to about 110° C., or about 110° C. to about 120° C.

In some aspects, the method may further include measuring one or more conditions or properties within the flow cell during operation of the electrochemical reactor. In some examples, the method may include measuring pH, conductivity, temperature, UV-visible spectroscopy, oxidation-reduction potential (ORP), x-ray fluorescence (XRF), pressure, flow, liquid level, inductively coupled plasma (ICP), or concentrations of hazards like Cl, Br, or F that could be generated as by-products. The one or more conditions or properties may be measured by one or more sensors. In some examples, one or more of the sensors may sit directly in the cell and measure the condition or property of the solution, flow cell, or electrodes continuously or periodically as the voltage is applied within the flow cell. In other examples, a small volume of the stream may be routed out of the main process flow and through a connected instrument containing one or more of the sensors. The method may further include adjusting the voltage applied between the anode and the cathode to selectively deposit the target material on the electrodes. In some examples, the one or more conditions or properties from the one or more of the sensors may be used to inform the feedback loop for adjusting the voltage within the flow cell to adjust/improve the selectively for the target material.

During depositing the corresponding metal or the corresponding metal oxide on the electrodes, the corresponding metal is deposited on the cathode and the corresponding metal oxide is deposited on the anode.

In some aspects, recovery may be done by passing a different liquid through the flow cell for chemical separation. For example, the method may include flowing an acidic, water-based, or solvent-based recovery solution through the flow cell to recover the target metal, the target metal oxide, and/or the target metal hydroxide without removing the electrodes by mechanical separation, chemical separation, or electrochemical separation. In some non-limiting examples, the recovery solution may be sulfuric acid, nitric acid, hydrochloric acid, or aqua regia.

The metal may be recovered from the electrodes either in situ within the electrochemical reactor or within separate recovery tanks. In some aspects, the method may further include removing the electrodes from the electrochemical reactor to recover the target metal or the corresponding target metal oxide. For example, the target metal or target metal oxide may be recovered by mechanical separation (e.g., sonication, mechanical shear, mechanical stripping/scraping, water jet, air jet), chemical separation (e.g., acidic dissolution of recovered metal), electrochemical separation (e.g., applied voltage/current, electrorefining), or a combination thereof. The method of recovery may be selected based on the starting mixture/solution and the properties of the particular target metal or mineral. In some examples the mixture/solution may have a lot of entrained liquid such that the target metal or mineral may be more loosely adhered to the electrode. In this example, mechanical scraping may be used to recover the target metal or mineral. In another example, the target metal or mineral may form more of a continuous layer or foil on the electrode surface and may be peeled off mechanically. Once the electrodes are removed from the electrochemical reactor, they may be placed in a recovery tank. In some examples, the cathode(s) may be placed in one recovery tank and the anode(s) may be placed in a separate recovery tank.

In other aspects, the target metal or the corresponding target metal oxide may be recovered in situ in the electrochemical reactor. In situ electrochemical refining may be used to achieve higher purity of the recovered target material, or because the product is too tightly bound on the silicon for mechanical recovery to be practical. In some aspects, the target metal or mineral is electrochemically refined by pairing the silicon electrode coated with the recovered material in an electrochemical cell with a counter-electrode composed of the target material. For example, a silicon electrode electrodeposited with copper following recovery would be place in an electrochemical cell with a counter-electrode made of pure copper foil, and the recovered copper would migrate selectively from the silicon to the pure copper, thereby further purifying it and regenerating the silicon for further use.

In some examples, the target metal or metal oxide recovered from the cathode(s) may be different than the target metal or metal oxide recovered from the anode(s).

The method may include recovering up to 100% yield of the target metal or mineral. In various examples, the yield of the target metal or mineral from the method may be about 90% to about 100%, about 90% to about 92%, about 92% to about 94%, about 94% to about 96%, about 96% to about 98%, about 98% to about 100%, about 99% to about 100%, more than 99%, more than 99.5%, or more than 99.9%. The yield may be defined by no detectable amount of target material being left in the mixture/solution following the electro-extraction. The yield may be improved to approach or reach 100% either by adding more electrodes in the series or circulating the stream of the mixture/solution in a closed loop through a set of electrodes for an amount of time. The purity of the recovered target metal or mineral may be greater than 95%, greater than 96%, greater than 97%, greater than 98%, greater than 99%, greater than 99.5%, greater than 99.9%, or 100%.

EXAMPLES

Figure 7:
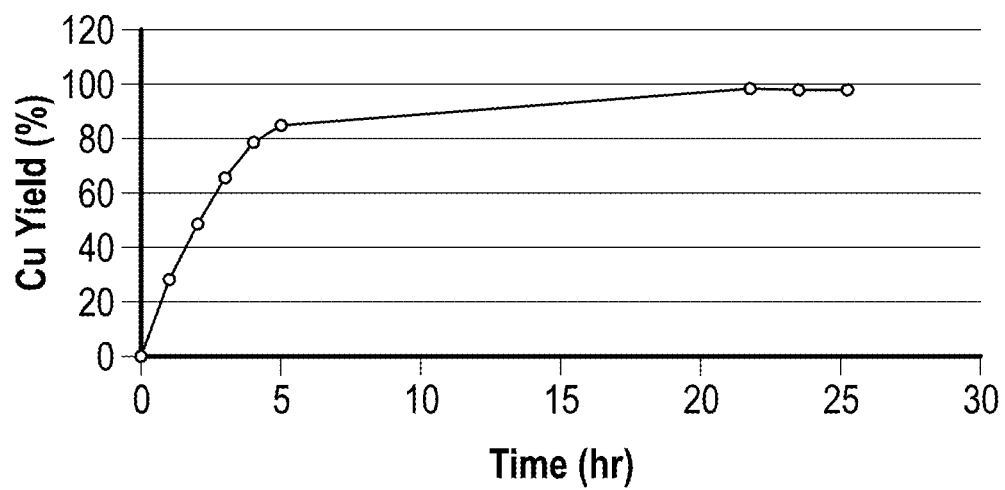
FIG. 7 shows the results for copper extraction from a complex acidic aqueous stream in one example.

In this example, a single silicon anode/cathode pairing was used in flow-around configuration (non-porous electrodes) to extract copper from a metal containing a complex acidic (pH ~2) solution. The anode was Pt coated while the cathode was not coated. The metal containing solution was recirculated through the flow cell continuously, so copper was depleted over time. FIG. 7 shows yield of the copper extracted from the solution over 25 hours and shows the extraction rate decrease as 100% yield is approached. FIG. 7 further shows a yield of greater than 90% is reached after about 15 hours and a yield of greater than 99% is reached after about 22 hours.

The copper was recovered from the electrodes mechanically via scraping of the electrode.

Definitions

As used herein, the term "about" is used to provide flexibility to a numerical range endpoint by providing that a given value may be "a little above" or "a little below" the endpoint. For example, the endpoint may be within 10%, 8%, 5%, 3%, 2%, or 1% of the listed value. Further, for the sake of convenience and brevity, a numerical range of "about 50 mg/mL to about 80 mg/mL" should also be understood to provide support for the range of "50 mg/mL to 80 mg/mL" The endpoint may also be based on the variability allowed by an appropriate regulatory body, such as the FDA, USP, etc.

As used herein, "comprises," "comprising," "containing," and "having" and the like can have the meaning ascribed to them in U.S. Patent Law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the composition's nature or characteristics would be permissible if present under the "consisting essentially of" language, even though not expressly recited in a list of items following such terminology. In this specification when using an open ended term, like "comprising" or "including," it is understood that direct support should be afforded also to "consisting essentially of" language as well as "consisting of" language as if stated explicitly and vice versa.

As used herein, first, second, third, etc. are used to characterize and distinguish various elements, components, regions, layers and/or sections. These elements, components, regions, layers and/or sections should not be limited by these terms. Use of numerical terms may be used to distinguish one element, component, region, layer and/or section from another element, component, region, layer and/or section. Use of such numerical terms does not imply a sequence or order unless clearly indicated by the context.

Such numerical references may be used interchangeably without departing from the teaching of the embodiments and variations herein.

As used herein, the terms "battery leachate solution," "black mass leachate," "mixture solution," "mixture," "solution," "metal or mineral containing solution", and "feed solution" may be used interchangeably to refer to the solution entering the electrochemical reactor. The solution may be a mixture comprising a solvent, a slurry, a suspension, or any solution with a viscosity allowing for flow through the electrochemical reactor.

As used herein, the terms "material", "compound," "product," and "component" are used to refer to any type of material, without any loss of generality of the material in question. That is, compound may refer to any metal, element, ion, molecule, complex structure(s), or combinations thereof (e.g., metal oxides, metal sulfides).

As used herein, "roughened" may refer to a surface that is non-uniform, uneven, or comprising asymmetric surface features.

As used herein, "electrochemical reactor", "reactor", "flow cell", and "electrochemical flow cell reactor" may be used interchangeably to refer to a system containing electrodes with an applied voltage and configured to flow a solution around or through the electrodes.

As a person skilled in the art will recognize from the previous detailed description and from the figures and claims, modifications and changes can be made to the embodiments of the invention without departing from the scope of this invention as defined in the following claims.

EXEMPLARY CLAUSES

1. An electrochemical reactor for extracting a target metal or mineral from a metal or mineral containing solution, the electrochemical reactor comprising:
    a flow cell, the flow cell comprising a plurality of electrodes comprising one or more anodes and one or more cathodes, each electrode comprising an electrode material; and
    a voltage source configured to apply a voltage between the one or more anodes and the one or more cathodes,
    wherein the one or more cathodes and anodes form an array of alternating anodes and cathodes, and
    wherein the flow cell is configured to extract the target metal or mineral from the metal or mineral containing solution.
2. The electrochemical reactor of clause 1, wherein the flow cell is a closed loop or partially closed loop configuration.
3. The electrochemical reactor of clause 1, wherein the metal or mineral containing solution passes between or through the plurality of electrodes.
4. The electrochemical reactor of clause 3, wherein flow of the metal or mineral containing solution is orthogonal to the applied voltage.
5. The electrochemical reactor of clause 1, wherein the metal or mineral containing solution is from a lithium-ion battery recycling stream, a mining production stream, a mining waste stream, a refining stream, or a mining-affected water source.
6. The electrochemical reactor of clause 1, wherein the target metal or mineral is selected from the group consisting of lithium, manganese, cobalt, nickel, copper, lead, zinc, silver, cadmium, precious metals (gold, silver), rare earth elements (lanthanum, cerium, praseodymium, neodymium, promethium, samarium, europium, gadolinium, terbium, dysprosium, holmium, erbium, thulium, ytterbium, lutetium, scandium, and yttrium), platinum, palladium, iridium, ruthenium, rhodium, osmium, rhenium, mercury, thallium, selenium, bismuth, lead, uranium, polonium, combinations thereof, and oxides or hydroxides thereof.
7. The electrochemical reactor of clause 6, wherein the coating comprises Pt/N.
8. The electrochemical reactor of clause 6, wherein the coating comprises Pt/Pb/Sb.
9. The electrochemical reactor of clause 6, wherein the coating comprises Pt/Pb/Sb/Ca.
10. The electrochemical reactor of clause 6, wherein the coating comprises Pt/Ir.
11. The electrochemical reactor of clause 6, wherein the coating comprises Pt/Ru.
12. The electrochemical reactor of clause 6, wherein the coating comprises Pt/Bi.
13. The electrochemical reactor of clause 6, wherein the coating comprises Pt/W.
14. The electrochemical reactor of clause 6, wherein the coating may be Au/Ni.
15. The electrochemical reactor of clause 6, wherein the coating comprises Au/Pb/Sb.
16. The electrochemical reactor of clause 6, wherein the coating comprises Au/Pb/Sb/Ca.
17. The electrochemical reactor of clause 6, wherein the coating comprises Au/Ir.
18. The electrochemical reactor of clause 6, wherein the coating comprises Au/Ru.
19. The electrochemical reactor of clause 6, wherein the coating comprises Au/Ni.
20. The electrochemical reactor of clause 6, wherein the coating comprises Au/W.
21. The electrochemical reactor of clause 6, wherein the coating comprises Au/Bi.
22. The electrochemical reactor of clause 6, wherein the coating comprises C/Ni.
23. The electrochemical reactor of clause 6, wherein the coating comprises Cu/Pb/Sb.
24. The electrochemical reactor of clause 6, wherein the coating comprises C/Pb/Sb/Ca.
25. The electrochemical reactor of clause 6, wherein the coating comprises C/Ir.
26. The electrochemical reactor of clause 6, wherein the coating comprises C/Ru.
27. The electrochemical reactor of clause 6, wherein the coating comprises C/W.
28. The electrochemical reactor of clause 6, wherein the coating comprises C/Bi.
29. The electrochemical reactor of clause 1, wherein the electrode material comprises silicon, carbon, stainless-steel, ferro-alloys, lead-alloys, or combinations thereof.
30. The electrochemical reactor of clause 29, wherein at least one of the plurality of electrodes is a silicon electrode.
31. The electrochemical reactor of clause 30, wherein the silicon electrode is reusable.
32. The electrochemical reactor of clause 30, wherein the silicon electrode is coated with a coating material selected from the group consisting of titanium, nickel, cobalt, copper, silver, platinum, palladium, gold, iridium, hafnium, ruthenium, rhodium, lead, antimony, calcium, and oxides or silicides thereof.

33. The electrochemical reactor of clause 32, wherein the coating has a thickness of about 0.5 nm to about 500 nm.
34. The electrochemical reactor of clause 32, wherein the coating material is deposited by physical vapor deposition (magnetron sputtering, electron beam evaporation, thermal evaporation, pulsed laser deposition), electroplating, ion implantation, thermal spray deposition, or chemical vapor deposition, and further refined by thermal annealing.
35. The electrochemical reactor of clause 1, wherein a surface of at least one of the plurality of electrodes is prepared prior to coating with ion-beam etching or with immersion in hydrofluoric acid at 0.1 wt % to 50 wt % HF in water.
36. The electrochemical reactor of clause 1, wherein the electrode material is non-porous.
37. The electrochemical reactor of clause 1, wherein the electrode material is porous.
38. The electrochemical reactor of clause 1, wherein a surface of the electrode material is roughened via mechanical, chemical, thermal, or photon-based methods such as sanding, sand blasting, laser roughening, or ion etching.
39. The electrochemical reactor of clause 1, wherein the plurality of electrodes are in series or parallel flow configurations, wherein the metal or mineral containing solution flows through porous electrodes or around non-porous electrodes.
40. The electrochemical reactor of clause 1, wherein distance between the plurality of electrodes ranges from about 1 mm to about 100 cm.
41. The electrochemical reactor of clause 1, wherein the plurality of electrodes have a thickness ranging from about 200 µm to about 1 cm.
42. A method for extracting a target metal from a metal or mineral containing solution, the method comprising:
   providing an electrochemical reactor, wherein the electrochemical reactor comprises a flow cell comprising a plurality of electrodes comprising one or more anodes and one or more cathodes, each electrode comprising silicon having a roughened surface;
   feeding the metal or mineral containing solution into the electrochemical reactor causing the metal or mineral containing solution to flow across or through the plurality of electrodes;
   applying a voltage between the plurality of electrodes;
   transferring the target metal from the metal or mineral containing solution to the plurality of electrodes by electrowinning;
   depositing the target metal, a corresponding target metal oxide, or a corresponding target metal hydroxide on the plurality of electrodes; and
   recovering the target metal or the corresponding target metal oxide, and/or the corresponding target metal hydroxide by mechanical separation, chemical separation, electrochemical separation, or a combination thereof.
43. The method of clause 42, wherein the silicon electrodes are non-porous.
44. The method of clause 42, wherein the silicon electrodes are porous.
45. The method of clause 42, wherein the voltage applied ranges from about 0 V to about 20V.
46. The method of clause 42, wherein the pH of the metal containing solution is from about −1 to less than 10.
47. The method of clause 42, further comprising maintaining the temperature of the flow cell from about 0° C. to about 120° C.
48. The method of clause 42, further comprising applying a current density ranging from about 0 to about 2 A cm$^{-2}$ between the plurality of electrodes.
49. The method of clause 42, wherein the target metal is selected from the group consisting of lithium, manganese, cobalt, nickel, copper, lead, zinc, silver, cadmium, precious metals (gold, silver), rare earth elements (lanthanum, cerium, praseodymium, neodymium, promethium, samarium, europium, gadolinium, terbium, dysprosium, holmium, erbium, thulium, ytterbium, lutetium, scandium, and yttrium), platinum, palladium, iridium, ruthenium, rhodium, osmium, rhenium, mercury, thallium, selenium, bismuth, lead, uranium, polonium, combinations thereof, and oxides or hydroxides thereof.
50. The method of clause 49, wherein the coating comprises Pt/N.
51. The method of clause 49, wherein the coating comprises Pt/Pb/Sb.
52. The method of clause 49, wherein the coating comprises Pt/Pb/Sb/Ca.
53. The method of clause 49, wherein the coating comprises Pt/Ir.
54. The method of clause 49, wherein the coating comprises Pt/Ru.
55. The method of clause 49, wherein the coating comprises Pt/Bi.
56. The method of clause 49, wherein the coating comprises Pt/W.
57. The method of clause 49, wherein the coating may be Au/Ni.
58. The method of clause 49, wherein the coating comprises Au/Pb/Sb.
59. The method of clause 49, wherein the coating comprises Au/Pb/Sb/Ca.
60. The method of clause 49, wherein the coating comprises Au/Ir.
61. The method of clause 49, wherein the coating comprises Au/Ru.
62. The method of clause 49, wherein the coating comprises Au/Ni.
63. The method of clause 49, wherein the coating comprises Au/W.
64. The method of clause 49, wherein the coating comprises Au/Bi.
65. The method of clause 49, wherein the coating comprises C/Ni.
66. The method of clause 49, wherein the coating comprises Cu/Pb/Sb.
67. The method of clause 49, wherein the coating comprises C/Pb/Sb/Ca.
68. The method of clause 49, wherein the coating comprises C/Ir.
69. The method of clause 49, wherein the coating comprises C/Ru.
70. The method of clause 49, wherein the coating comprises C/W.
71. The method of clause 49, wherein the coating comprises C/Bi.
72. The method of clause 42, further comprising flowing an acidic, water-based, or solvent-based solution through the flow cell to recover the target metal, the corresponding target metal oxide, and/or the corresponding target metal hydroxide without removing the plurality of electrodes by mechanical separation, chemical separation, or electrochemical separation.

73. The method of clause 42, further comprising disassembling the electrochemical reactor by removing the electrodes to recover the target metal, the corresponding target metal oxide, and/or the corresponding target metal hydroxide.

74. The method of clause 42, further comprising recovering the target metal, the corresponding target metal oxide, and/or the corresponding target metal hydroxide in situ in the electrochemical reactor.

75. The method of clause 74, wherein the target metal, the corresponding target metal oxide, and/or the corresponding target metal hydroxide is recovered in situ by placing a counter-electrode in the electrochemical reactor, wherein the recovered target metal migrates selectively from the plurality of electrodes to the counter-electrode, thereby further purifying the target metal and regenerating the silicon for further use.

76. The method of clause 42, wherein the mechanical separation comprises sonication, mechanical shear or mechanical stripping, air jet, or water jet.

77. The method of clause 42, wherein the chemical separation comprises acidic dissolution of the recovered metal.

78. The method of clause 42, wherein the electrochemical separation comprises electrorefining.

What is claimed is:

1. An electrochemical reactor for extracting a target metal or mineral from a metal or mineral containing solution, the electrochemical reactor comprising:
   a flow cell, the flow cell comprising a plurality of silicon electrodes comprising two or more anodes and two or more cathodes; and
   a voltage source configured to apply a voltage between the one two or more anodes and the two or more cathodes,
   wherein the two or more cathodes and anodes form an array of alternating anodes and cathodes,
   wherein the metal or mineral containing solution is acidic,
   wherein the flow cell is configured to extract the target metal or mineral from the metal or mineral containing solution, and
   wherein the plurality of silicon electrodes are coated with a coating material comprising Pt/N, Pt/Pb/Sb, Pt/Pb/Sb/Ca, Pt/Ir, Pt/Ru, Pt/Bi, Pt/Hf, or Pt/W.

2. The electrochemical reactor of claim 1, wherein the flow cell is a closed loop or partially closed loop configuration.

3. The electrochemical reactor of claim 1, wherein the metal or mineral containing solution passes between or through the plurality of silicon electrodes.

4. The electrochemical reactor of claim 3, wherein flow of the metal or mineral containing solution is orthogonal to the applied voltage.

5. The electrochemical reactor of claim 1, wherein the metal or mineral containing solution is from a lithium-ion battery recycling stream, a mining production stream, a mining waste stream, a refining stream, or a mining-affected water source.

6. The electrochemical reactor of claim 1, wherein the target metal or mineral is selected from the group consisting of lithium, manganese, cobalt, nickel, copper, lead, zinc, silver, cadmium, gold, silver, lanthanum, cerium, praseodymium, neodymium, promethium, samarium, europium, gadolinium, terbium, dysprosium, holmium, erbium, thulium, ytterbium, lutetium, scandium, yttrium, platinum, palladium, iridium, ruthenium, rhodium, osmium, rhenium, mercury, thallium, selenium, bismuth, lead, uranium, polonium, combinations thereof, and oxides or hydroxides thereof.

7. The electrochemical reactor of claim 1, wherein the plurality of silicon electrodes are reusable.

8. The electrochemical reactor of claim 1, wherein the coating has a thickness of 0.5 nm to 500 nm.

9. The electrochemical reactor of claim 1, wherein the coating material is deposited by physical vapor deposition, magnetron sputtering, electron beam evaporation, thermal evaporation, pulsed laser deposition, electroplating, ion implantation, thermal spray deposition, or chemical vapor deposition, and further refined by thermal annealing.

10. The electrochemical reactor of claim 1, wherein a surface of at least one of the plurality of silicon electrodes is prepared prior to coating with ion-beam etching or with immersion in hydrofluoric acid at 0.1 wt % to 50 wt % HF in water.

11. The electrochemical reactor of claim 1, wherein the electrode material is non-porous.

12. The electrochemical reactor of claim 1, wherein the electrode material is porous.

13. The electrochemical reactor of claim 1, wherein a surface of the electrode material is roughened via mechanical, chemical, thermal, or ion plasma-based methods such as sanding, sand blasting, or ion etching.

14. The electrochemical reactor of claim 1, wherein the plurality of electrodes are in series or parallel flow configurations, wherein the metal or mineral containing solution flows through porous the plurality of silicon electrodes when the plurality of silicon electrodes are porous or around the plurality of silicon electrodes when the plurality of silicon electrodes are non-porous.

15. The electrochemical reactor of claim 1, wherein distance between the plurality of silicon electrodes ranges from 1 mm to 100 cm.

16. The electrochemical reactor of claim 1, wherein the plurality of silicon electrodes have a thickness ranging from 200 µm to 1 cm.

17. The electrochemical reactor of claim 1, wherein the coating material comprises Pt/Ir.

18. The electrochemical reactor of claim 1, wherein the metal or mineral containing solution has a pH less than 3.

19. The electrochemical reactor of claim 1, wherein the metal or mineral containing solution comprises sulfuric acid, hydrochloric acid, nitric acid, or combinations thereof.

20. The electrochemical reactor of claim 19, wherein the metal or mineral containing solution comprises sulfuric acid.

21. The electrochemical reactor of claim 1, wherein the plurality of silicon electrodes comprise monolithic silicon.

22. The electrochemical reactor of claim 1, wherein the coating has a thickness of about 0.5 nm to about 500 nm.

23. An electrochemical reactor for extracting a target metal or mineral from a metal or mineral containing solution, the electrochemical reactor comprising:
   a flow cell, the flow cell comprising a plurality of silicon electrodes comprising two or more anodes and two or more cathodes; and
   a voltage source configured to apply a voltage between the two or more anodes and the two or more cathodes,
   wherein the two or more cathodes and anodes form an array of alternating anodes and cathodes,
   wherein the metal or mineral containing solution is acidic,
   wherein the flow cell is configured to extract the target metal or mineral from the metal or mineral containing solution, and wherein the plurality of silicon electrodes are coated with a coating material comprising Au/Ni, Au/Pb/Sb, Au/Pb/Sb/Ca, Au/Ir, Au/Ru, Au/W, Au/Hf, or Au/Bi.

24. The electrochemical reactor of claim 23, wherein the plurality of silicon electrodes comprise monolithic silicon.

25. The electrochemical reactor of claim 23, wherein the coating has a thickness of about 0.5 nm to about 500 nm.

26. An electrochemical reactor for extracting a target metal or mineral from a metal or mineral containing solution, the electrochemical reactor comprising:
  a flow cell, the flow cell comprising a plurality of silicon electrodes comprising two or more anodes and two or more cathodes; and
  a voltage source configured to apply a voltage between the two or more anodes and the two or more cathodes,
  wherein the two or more cathodes and anodes form an array of alternating anodes and cathodes,
  wherein the metal or mineral containing solution is acidic,
  wherein the flow cell is configured to extract the target metal or mineral from the metal or mineral containing solution, and
  wherein the plurality of silicon electrodes are coated with a coating material comprising C/Ni, Cu/Pb/Sb, C/Pb/Sb/Ca, C/Ir, C/Ru, C/W, or C/Bi.

27. The electrochemical reactor of claim 26, wherein the plurality of silicon electrodes comprise monolithic silicon.

28. The electrochemical reactor of claim 26, wherein the coating has a thickness of about 0.5 nm to about 500 nm.

29. An electrochemical reactor for extracting a target metal or mineral from a metal or mineral containing solution, the electrochemical reactor comprising:
  a flow cell, the flow cell comprising a plurality of silicon electrodes comprising two or more anodes and two or more cathodes; and
  a voltage source configured to apply a voltage between the two or more anodes and the two or more cathodes,
  wherein the two or more cathodes and anodes form an array of alternating anodes and cathodes,
  wherein the metal or mineral containing solution is acidic,
  wherein the flow cell is configured to extract the target metal or mineral from the metal or mineral containing solution, and
  wherein the plurality of silicon electrodes are coated with a coating material comprising Hf/Pb, Hf/Sb, Hf/Ca, Hf/Ru, Hf/Rh, Ti/Hf, Ni/Hf, Co/Hf, Cu/Hf, Ag/Hf, Pt/Hf, Pd/Hf, or Ir/Hf.

30. The electrochemical reactor of claim 29, wherein the plurality of silicon electrodes comprise monolithic silicon.

31. The electrochemical reactor of claim 29, wherein the coating has a thickness of about 0.5 nm to about 500 nm.

\* \* \* \* \*